US009489691B2

(12) United States Patent
Lowe et al.

(10) Patent No.: US 9,489,691 B2
(45) Date of Patent: *Nov. 8, 2016

(54) ARTICLE VENDING MACHINE AND METHOD FOR EXCHANGING AN INOPERABLE ARTICLE FOR AN OPERABLE ARTICLE

(71) Applicant: Redbox Automated Retail, LLC, Oakbrook Terrace, IL (US)

(72) Inventors: J. Mitchell Lowe, Mill Valley, CA (US); Eric Hoersten, Chicago, IL (US); Christopher A. Kapcar, Hinsdale, IL (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,924

(22) Filed: Mar. 25, 2015

(65) Prior Publication Data
US 2015/0269660 A1 Sep. 24, 2015

Related U.S. Application Data

(63) Continuation of application No. 12/554,906, filed on Sep. 5, 2009, now Pat. No. 8,996,162.

(51) Int. Cl.
*G06Q 30/06* (2012.01)
*G06Q 10/08* (2012.01)
(Continued)

(52) U.S. Cl.
CPC .......... *G06Q 30/0645* (2013.01); *G06Q 10/06* (2013.01); *G06Q 10/087* (2013.01);
(Continued)

(58) Field of Classification Search
CPC .................................. G06Q 30/0645
USPC .......... 700/231, 232, 236, 237, 241
See application file for complete search history.

(56) References Cited

U.S. PATENT DOCUMENTS 1,901,243 A 3/1933 Horwitt
2,098,697 A 11/1937 Vanderput
(Continued)

FOREIGN PATENT DOCUMENTS

CA 1236546 A1 5/1988
CA 2302753 A1 5/1999
(Continued)

OTHER PUBLICATIONS

International Search Report for Application No. PCT/US2006/15125, mailed on Jan. 11, 2007, 1 page.
(Continued)

*Primary Examiner* — Michael K Collins
(74) *Attorney, Agent, or Firm* — James P. Muraff; Neal, Gerber & Eisenberg LLP

(57) ABSTRACT

An article vending machine in a network of article vending machines capable of exchanging an inoperable rental article received from a user for an operable replacement article. The article dispensing machine checks customer identification information against one or more customer rental criteria to determine if the customer is eligible to exchange an inoperable article for an operable one. The article vending machine searches for an identical replacement article within an inventory of the machine itself and within inventories of the networked article vending machines. Alternatively, the article vending machine may provide a refund for the inoperable article.

18 Claims, 17 Drawing Sheets

(51) Int. Cl.
*G06Q 20/18* (2012.01)
*G06Q 20/20* (2012.01)
*G07F 11/00* (2006.01)
*G07F 11/54* (2006.01)
*G06Q 10/06* (2012.01)

(52) U.S. Cl.
CPC ............ *G06Q 20/18* (2013.01); *G06Q 20/203* (2013.01); *G06Q 20/204* (2013.01); *G07F 11/002* (2013.01); *G07F 11/54* (2013.01)

(56) References Cited

U.S. PATENT DOCUMENTS

| | | | |
|---|---|---|---|
| 2,549,624 | A | 4/1951 | Moore |
| 2,559,599 | A | 7/1951 | Crump et al. |
| 2,562,293 | A | 7/1951 | Bourquin |
| 3,267,436 | A | 8/1966 | Alpert et al. |
| 3,379,295 | A | 4/1968 | Varley |
| 3,404,764 | A | 10/1968 | Lipp et al. |
| 3,529,155 | A | 9/1970 | Hansen |
| 3,622,995 | A | 11/1971 | Dilks et al. |
| 3,648,241 | A | 3/1972 | Naito et al. |
| 3,824,544 | A | 7/1974 | Simjian |
| 3,826,344 | A | 7/1974 | Wahlberg |
| 3,831,807 | A | 8/1974 | Deaton et al. |
| 3,946,220 | A | 3/1976 | Brobeck et al. |
| 3,964,577 | A | 6/1976 | Bengtsson |
| 4,043,483 | A | 8/1977 | Gore et al. |
| 4,073,368 | A | 2/1978 | Mustapick |
| 4,300,040 | A | 11/1981 | Gould et al. |
| 4,306,219 | A | 12/1981 | Main et al. |
| 4,348,551 | A | 9/1982 | Nakatani et al. |
| 4,369,422 | A | 1/1983 | Rasmussen et al. |
| 4,369,442 | A | 1/1983 | Werth et al. |
| 4,385,366 | A | 5/1983 | Housey, Jr. |
| 4,388,689 | A | 6/1983 | Hayman et al. |
| 4,396,985 | A | 8/1983 | Ohara |
| 4,414,467 | A | 11/1983 | Gould et al. |
| 4,415,065 | A | 11/1983 | Sandstedt |
| 4,449,186 | A | 5/1984 | Kelly et al. |
| 4,458,802 | A | 7/1984 | MacIver et al. |
| 4,519,522 | A | 5/1985 | McElwee |
| 4,530,067 | A | 7/1985 | Dorr |
| 4,547,851 | A | 10/1985 | Kurland |
| 4,553,222 | A | 11/1985 | Kurland et al. |
| 4,567,359 | A | 1/1986 | Lockwood |
| 4,569,421 | A | 2/1986 | Sandstedt |
| RE32,115 | E | 4/1986 | Lockwood et al. |
| 4,598,810 | A | 7/1986 | Shore et al. |
| 4,649,481 | A | 3/1987 | Takahashi |
| 4,650,977 | A | 3/1987 | Couch |
| 4,668,150 | A | 5/1987 | Blumberg |
| 4,669,596 | A | 6/1987 | Capers et al. |
| 4,675,515 | A | 6/1987 | Lucero |
| 4,706,794 | A | 11/1987 | Awane et al. |
| 4,722,053 | A | 1/1988 | Dubno et al. |
| 4,723,212 | A | 2/1988 | Mindrum et al. |
| 4,734,005 | A | 3/1988 | Blumberg |
| 4,766,548 | A | 8/1988 | Cedrone et al. |
| 4,767,917 | A | 8/1988 | Ushikubo |
| 4,775,935 | A | 10/1988 | Yourick |
| 4,778,983 | A | 10/1988 | Ushikubo |
| 4,789,045 | A | 12/1988 | Pugh |
| 4,789,054 | A | 12/1988 | Shore et al. |
| 4,797,818 | A | 1/1989 | Cotter |
| 4,812,629 | A | 3/1989 | O'Niel et al. |
| 4,812,985 | A | 3/1989 | Hambrick et al. |
| 4,814,592 | A | 3/1989 | Bradt et al. |
| 4,814,985 | A | 3/1989 | Swistak |
| 4,821,629 | A | 4/1989 | Davison et al. |
| 4,821,917 | A | 4/1989 | Brown |
| 4,825,045 | A | 4/1989 | Humble |
| 4,839,505 | A | 6/1989 | Bradt et al. |
| 4,839,507 | A | 6/1989 | May |
| 4,847,764 | A | 7/1989 | Halvorson |
| 4,858,743 | A | 8/1989 | Paraskevakos et al. |
| 4,860,876 | A | 8/1989 | Moore et al. |
| 4,866,661 | A | 9/1989 | De Prins |
| 4,875,598 | A | 10/1989 | Dahl |
| 4,882,475 | A | 11/1989 | Miller et al. |
| 4,893,705 | A | 1/1990 | Brown |
| 4,893,727 | A | 1/1990 | Near |
| 4,896,024 | A | 1/1990 | Morello et al. |
| 4,903,815 | A | 2/1990 | Hirschfeld et al. |
| 4,915,205 | A | 4/1990 | Reid et al. |
| D308,052 | S | 5/1990 | Darden et al. |
| 4,921,128 | A | 5/1990 | Guigan et al. |
| 4,941,841 | A | 7/1990 | Darden et al. |
| 4,945,428 | A | 7/1990 | Waldo |
| 4,947,028 | A | 8/1990 | Gorog |
| 4,959,686 | A | 9/1990 | Spallone et al. |
| 4,967,403 | A | 10/1990 | Ogawa et al. |
| 4,967,906 | A | 11/1990 | Morello et al. |
| 4,982,346 | A | 1/1991 | Girouard et al. |
| 4,991,739 | A | 2/1991 | Levasseur |
| 4,995,498 | A | 2/1991 | Menke |
| 5,007,518 | A | 4/1991 | Crooks et al. |
| 5,012,077 | A | 4/1991 | Takano |
| 5,013,897 | A | 5/1991 | Harman et al. |
| 5,019,699 | A | 5/1991 | Koenck |
| 5,020,958 | A | 6/1991 | Tuttobene |
| 5,028,766 | A | 7/1991 | Shah |
| 5,042,686 | A | 8/1991 | Stucki |
| 5,077,462 | A | 12/1991 | Newell et al. |
| 5,077,607 | A | 12/1991 | Johnson et al. |
| 5,085,308 | A | 2/1992 | Wilhelm |
| 5,088,586 | A | 2/1992 | Isobe et al. |
| 5,091,713 | A | 2/1992 | Horne et al. |
| 5,095,195 | A | 3/1992 | Harman et al. |
| 5,105,069 | A | 4/1992 | Hakenewerth et al. |
| 5,128,862 | A | 7/1992 | Mueller |
| 5,133,441 | A | 7/1992 | Brown |
| 5,139,384 | A | 8/1992 | Tuttobene |
| 5,143,193 | A | 9/1992 | Geraci |
| 5,159,560 | A | 10/1992 | Newell et al. |
| 5,205,436 | A | 4/1993 | Savage |
| 5,206,814 | A | 4/1993 | Cahlander et al. |
| 5,207,784 | A | 5/1993 | Schwartzendruber |
| 5,212,649 | A | 5/1993 | Pelletier et al. |
| 5,226,519 | A | 7/1993 | Dewoolfson |
| 5,235,509 | A | 8/1993 | Mueller et al. |
| RE34,369 | E | 9/1993 | Darden et al. |
| 5,273,183 | A | 12/1993 | Tuttobene |
| 5,313,392 | A | 5/1994 | Temma et al. |
| 5,313,393 | A | 5/1994 | Varley et al. |
| 5,319,705 | A | 6/1994 | Halter et al. |
| 5,323,327 | A | 6/1994 | Carmichael et al. |
| 5,353,219 | A | 10/1994 | Mueller et al. |
| 5,383,111 | A | 1/1995 | Homma et al. |
| 5,385,265 | A | 1/1995 | Schlamp |
| 5,402,911 | A | 4/1995 | Noelle |
| 5,408,417 | A | 4/1995 | Wilder |
| 5,409,092 | A | 4/1995 | Itako et al. |
| 5,418,713 | A | 5/1995 | Allen |
| 5,442,568 | A | 8/1995 | Ostendorf et al. |
| 5,445,295 | A | 8/1995 | Brown |
| 5,450,584 | A | 9/1995 | Sekiguchi et al. |
| 5,450,938 | A | 9/1995 | Rademacher |
| 5,467,892 | A | 11/1995 | Schlamp |
| 5,482,139 | A | 1/1996 | Rivalto |
| 5,484,988 | A | 1/1996 | Hills et al. |
| 5,499,707 | A | 3/1996 | Steury |
| 5,504,675 | A | 4/1996 | Cragun et al. |
| 5,510,979 | A | 4/1996 | Moderi et al. |
| 5,513,116 | A | 4/1996 | Buckley et al. |
| 5,546,316 | A | 8/1996 | Buckley et al. |
| 5,550,746 | A | 8/1996 | Jacobs |
| 5,555,143 | A | 9/1996 | Hinnen et al. |
| 5,559,714 | A | 9/1996 | Banks et al. |
| 5,559,887 | A | 9/1996 | Davis et al. |
| 5,561,604 | A | 10/1996 | Buckley et al. |
| 5,576,951 | A | 11/1996 | Lockwood |
| 5,594,791 | A | 1/1997 | Szlam et al. |
| 5,608,643 | A | 3/1997 | Wichter et al. |

(56) References Cited

U.S. PATENT DOCUMENTS

| | | |
|---|---|---|
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls |
| 5,638,985 A | 6/1997 | Fitzgerald et al. |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan |
| 5,715,403 A | 2/1998 | Stefik et al. |
| 5,724,069 A | 3/1998 | Chen |
| 5,724,521 A | 3/1998 | Dedrick |
| 5,732,398 A | 3/1998 | Tagawa |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs |
| 5,769,269 A | 6/1998 | Peters |
| 5,777,884 A | 7/1998 | Belka et al. |
| H1743 H | 8/1998 | Graves et al. |
| 5,790,677 A | 8/1998 | Fox et al. |
| 5,806,071 A | 9/1998 | Balderrama et al. |
| 5,822,216 A | 10/1998 | Satchell, Jr. et al. |
| 5,822,291 A | 10/1998 | Brindze et al. |
| 5,831,862 A | 11/1998 | Hetrick et al. |
| 5,832,503 A | 11/1998 | Malik et al. |
| 5,850,442 A | 12/1998 | Muftic |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell |
| 5,898,594 A | 4/1999 | Leason et al. |
| 5,900,608 A | 5/1999 | Iida |
| 5,905,246 A | 5/1999 | Fajkowski |
| 5,923,016 A | 7/1999 | Fredregill et al. |
| 5,930,771 A | 7/1999 | Stapp |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,943,423 A | 8/1999 | Muftic |
| 5,950,173 A | 9/1999 | Perkowski |
| 5,954,797 A | 9/1999 | Sidey |
| 5,956,694 A | 9/1999 | Powell |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott |
| 5,988,346 A | 11/1999 | Tedesco et al. |
| 5,988,431 A | 11/1999 | Roe |
| 5,997,170 A | 12/1999 | Brodbeck |
| 6,002,395 A | 12/1999 | Wagner et al. |
| 6,010,239 A | 1/2000 | Hardgrave et al. |
| 6,014,137 A | 1/2000 | Burns |
| 6,029,851 A | 2/2000 | Jenkins et al. |
| 6,039,244 A | 3/2000 | Finsterwald |
| 6,044,362 A | 3/2000 | Neely |
| 6,047,338 A | 4/2000 | Grolemund |
| 6,050,448 A | 4/2000 | Willis |
| 6,056,150 A | 5/2000 | Kasper |
| 6,056,194 A | 5/2000 | Kolls |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata |
| 6,119,934 A | 9/2000 | Kolls |
| 6,123,223 A | 9/2000 | Watkins |
| 6,125,353 A | 9/2000 | Yagasaki |
| 6,126,036 A | 10/2000 | D'Alayer De Costemore D' arc et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,438,447 B1 | 8/2002 | Belka et al. |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg, Jr. et al. |
| 6,466,830 B1 | 10/2002 | Manross et al. |
| 6,477,503 B1 | 11/2002 | Mankes |
| 6,490,502 B2 | 12/2002 | Fellows et al. |
| 6,493,110 B1 | 12/2002 | Roberts |
| 6,505,095 B1 | 1/2003 | Kolls |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,675,067 B2 | 1/2004 | Blad |

(56) References Cited

U.S. PATENT DOCUMENTS

| | | |
|---|---|---|
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair, III et al. |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B1 | 8/2005 | Fajkowski |
| 6,954,732 B1 | 10/2005 | Delapa et al. |
| 6,959,285 B2 | 10/2005 | Stefanik et al. |
| 6,959,286 B2 | 10/2005 | Perkowski |
| 6,965,869 B1 | 11/2005 | Tomita et al. |
| 6,968,365 B2 | 11/2005 | Hollstrom et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |
| 7,024,390 B1 | 4/2006 | Mori et al. |
| 7,043,497 B1 | 5/2006 | Carty et al. |
| 7,053,773 B2 | 5/2006 | McGarry et al. |
| 7,058,581 B1 | 6/2006 | Young |
| 7,076,328 B2 | 7/2006 | Piikivi |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,085,556 B2 | 8/2006 | Offer |
| 7,085,727 B2 | 8/2006 | Vanorman |
| 7,101,139 B1 | 9/2006 | Benedict |
| 7,108,180 B2 | 9/2006 | Brusso et al. |
| 7,139,731 B1 | 11/2006 | Alvin |
| 7,167,842 B1 | 1/2007 | Josephson, II et al. |
| 7,167,892 B2 | 1/2007 | Defosse et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,213,753 B2 | 5/2007 | Barton et al. |
| 7,233,916 B2 | 6/2007 | Schultz |
| 7,234,609 B2 | 6/2007 | Delazzer et al. |
| 7,236,942 B1 | 6/2007 | Walker et al. |
| 7,236,946 B2 | 6/2007 | Bates et al. |
| 7,240,805 B2 | 7/2007 | Chirnomas |
| 7,240,843 B2 | 7/2007 | Paul et al. |
| 7,310,612 B2 | 12/2007 | McQueen, III et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,584,869 B2 | 9/2009 | Delazzer et al. |
| 7,747,346 B2 | 6/2010 | Lowe et al. |
| RE41,543 E | 8/2010 | Satchell, Jr. et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,797,164 B2 | 9/2010 | Junger et al. |
| 7,853,354 B2 | 12/2010 | Kuehnrich et al. |
| 7,853,600 B2 | 12/2010 | Herz et al. |
| 7,860,606 B2 | 12/2010 | Rudy |
| 7,925,973 B2 | 4/2011 | Allaire et al. |
| 7,988,049 B2 | 8/2011 | Kuehnrich |
| 8,036,774 B2 | 10/2011 | Blust et al. |
| 8,041,454 B2 | 10/2011 | Blust et al. |
| 8,060,249 B2 | 11/2011 | Bear et al. |
| 8,078,316 B2 | 12/2011 | Blust et al. |
| 8,086,349 B2 | 12/2011 | Blust et al. |
| 8,234,207 B2 | 7/2012 | Breitenbach et al. |
| 8,235,247 B2 | 8/2012 | Alvarez |
| 8,306,908 B1 | 11/2012 | Barker et al. |
| 8,352,449 B1 | 1/2013 | Parekh et al. |
| 8,386,347 B2 | 2/2013 | Hoblit |
| 8,412,374 B2 | 4/2013 | Kuehnrich et al. |
| 8,417,380 B2 | 4/2013 | Kuehnrich et al. |
| 8,463,432 B2 | 6/2013 | Weinshenker |
| 8,510,171 B2 | 8/2013 | Pederson et al. |
| 8,752,093 B2 | 6/2014 | White et al. |
| 8,996,162 B2* | 3/2015 | Lowe .................. G06Q 10/06 700/232 |
| 9,104,990 B2* | 8/2015 | Lowe .................. G06Q 10/06 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 | 9/2002 | Jenkins et al. |
| 2002/0133269 A1 | 9/2002 | Anselmi |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |
| 2003/0004828 A1 | 1/2003 | Epstein |
| 2003/0009408 A1 | 1/2003 | Korin |
| 2003/0023453 A1 | 1/2003 | Hafen et al. |
| 2003/0030539 A1 | 2/2003 | McGarry et al. |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149510 A1 | 8/2003 | Takahashi |
| 2003/0154141 A1 | 8/2003 | Capazario et al. |
| 2003/0163382 A1 | 8/2003 | Stefanik et al. |
| 2003/0163399 A1 | 8/2003 | Harper et al. |
| 2003/0167231 A1 | 9/2003 | Winking et al. |
| 2003/0204289 A1 | 10/2003 | Banerjee et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064347 A1 | 4/2004 | Vanorman |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 | 4/2004 | Messenger et al. |
| 2004/0133466 A1 | 7/2004 | Redmond et al. |

(56) References Cited

U.S. PATENT DOCUMENTS

| | | |
|---|---|---|
| 2004/0133653 A1 | 7/2004 | Defosse et al. |
| 2004/0153413 A1 | 8/2004 | Gross |
| 2004/0158503 A1 | 8/2004 | Gross |
| 2004/0158504 A1 | 8/2004 | Gross |
| 2004/0158871 A1 | 8/2004 | Jacobson |
| 2004/0162633 A1 | 8/2004 | Kraft et al. |
| 2004/0162783 A1 | 8/2004 | Gross |
| 2004/0172274 A1 | 9/2004 | Gross |
| 2004/0172275 A1 | 9/2004 | Gross |
| 2004/0172342 A1 | 9/2004 | Gross |
| 2004/0186783 A1 | 9/2004 | Knight et al. |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1 | 2/2005 | Knowles et al. |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0197855 A1 | 9/2005 | Nudd et al. |
| 2005/0216120 A1 | 9/2005 | Rosenberg et al. |
| 2005/0230410 A1 | 10/2005 | Delazzer et al. |
| 2005/0230473 A1 | 10/2005 | Fajkowski |
| 2005/0234911 A1 | 10/2005 | Hess et al. |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0045660 A1 | 3/2006 | Di Rosa |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0122881 A1 | 6/2006 | Walker et al. |
| 2006/0149685 A1 | 7/2006 | Gross |
| 2006/0155575 A1 | 7/2006 | Gross |
| 2006/0184395 A1 | 8/2006 | Millwee |
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |
| 2006/0231613 A1 | 10/2006 | Walker et al. |
| 2006/0231614 A1 | 10/2006 | Walker et al. |
| 2006/0235746 A1 | 10/2006 | Hammond et al. |
| 2006/0235747 A1 | 10/2006 | Hammond et al. |
| 2006/0241966 A1 | 10/2006 | Walker et al. |
| 2006/0241967 A1 | 10/2006 | Gross |
| 2006/0242059 A1 | 10/2006 | Hansen |
| 2006/0247823 A1 | 11/2006 | Boucher |
| 2006/0247824 A1 | 11/2006 | Walker et al. |
| 2006/0254832 A1 | 11/2006 | Strong |
| 2006/0254862 A1 | 11/2006 | Hoersten |
| 2006/0259190 A1 | 11/2006 | Hale |
| 2006/0259191 A1 | 11/2006 | Lowe |
| 2006/0259192 A1* | 11/2006 | Lowe ............... G06Q 10/06311 700/236 |
| 2006/0265101 A1 | 11/2006 | Kaplan et al. |
| 2006/0265286 A1 | 11/2006 | Evangelist et al. |
| 2006/0266823 A1 | 11/2006 | Passen et al. |
| 2006/0272922 A1 | 12/2006 | Hoersten et al. |
| 2006/0273152 A1 | 12/2006 | Fields |
| 2007/0005438 A1 | 1/2007 | Evangelist et al. |
| 2007/0011093 A1 | 1/2007 | Tree |
| 2007/0011903 A1 | 1/2007 | Chang |
| 2007/0050083 A1 | 3/2007 | Signorelli et al. |
| 2007/0050256 A1 | 3/2007 | Walker et al. |
| 2007/0050266 A1 | 3/2007 | Barber et al. |
| 2007/0051802 A1 | 3/2007 | Barber et al. |
| 2007/0063020 A1 | 3/2007 | Barrafato |
| 2007/0063027 A1 | 3/2007 | Belfer et al. |
| 2007/0067429 A1 | 3/2007 | Jain et al. |
| 2007/0084872 A1 | 4/2007 | Hair, III et al. |
| 2007/0084917 A1 | 4/2007 | Fajkowski |
| 2007/0094245 A1 | 4/2007 | Vigil |
| 2007/0095901 A1 | 5/2007 | Illingworth |
| 2007/0125104 A1 | 6/2007 | Ehlers |
| 2007/0130020 A1 | 6/2007 | Paolini |
| 2007/0136247 A1 | 6/2007 | Vigil |
| 2007/0156442 A1 | 7/2007 | Ali |
| 2007/0156578 A1 | 7/2007 | Perazolo |
| 2007/0162183 A1 | 7/2007 | Pinney et al. |
| 2007/0162184 A1 | 7/2007 | Pinney et al. |
| 2007/0169132 A1 | 7/2007 | Blust et al. |
| 2007/0175986 A1 | 8/2007 | Petrone et al. |
| 2007/0179668 A1 | 8/2007 | Mellin |
| 2007/0185776 A1 | 8/2007 | Nguyen et al. |
| 2007/0210153 A1 | 9/2007 | Walker et al. |
| 2007/0213871 A1 | 9/2007 | Whitten et al. |
| 2007/0252003 A1 | 11/2007 | Goldring et al. |
| 2007/0276537 A1 | 11/2007 | Walker et al. |
| 2007/0299737 A1 | 12/2007 | Plastina et al. |
| 2008/0005025 A1 | 1/2008 | Legere et al. |
| 2008/0027835 A1 | 1/2008 | Lemasters et al. |
| 2008/0040211 A1 | 2/2008 | Walker et al. |
| 2008/0097770 A1 | 4/2008 | Low et al. |
| 2008/0116262 A1 | 5/2008 | Majer |
| 2008/0125906 A1 | 5/2008 | Bates et al. |
| 2008/0131255 A1 | 6/2008 | Hessler et al. |
| 2008/0222690 A1 | 9/2008 | Kim |
| 2008/0239961 A1 | 10/2008 | Hilerio et al. |
| 2008/0249658 A1 | 10/2008 | Walker et al. |
| 2008/0275591 A1 | 11/2008 | Chirnomas et al. |
| 2008/0313973 A1 | 12/2008 | Butler Rolf |
| 2009/0018792 A1 | 1/2009 | Kuehnrich |
| 2009/0030931 A1 | 1/2009 | Khivesara et al. |
| 2009/0048932 A1 | 2/2009 | Barber |
| 2009/0089187 A1 | 4/2009 | Hoersten et al. |
| 2009/0113116 A1 | 4/2009 | Thompson et al. |
| 2009/0139886 A1 | 6/2009 | Blust et al. |
| 2009/0299824 A1 | 12/2009 | Barnes, Jr. |
| 2009/0326708 A1 | 12/2009 | Rudy et al. |
| 2010/0010964 A1 | 1/2010 | Skowronek et al. |
| 2010/0036808 A1 | 2/2010 | Lee |
| 2010/0042577 A1 | 2/2010 | Rinearson |
| 2010/0057871 A1 | 3/2010 | Kaplan et al. |
| 2010/0127013 A1 | 5/2010 | Butler |
| 2010/0138037 A1 | 6/2010 | Adelberg et al. |
| 2010/0153983 A1 | 6/2010 | Philmon et al. |
| 2010/0198400 A1 | 8/2010 | Pascal et al. |
| 2010/0211217 A1 | 8/2010 | Hirsh et al. |
| 2010/0274624 A1 | 10/2010 | Rochford et al. |
| 2010/0296908 A1 | 11/2010 | Ko |
| 2010/0312380 A1 | 12/2010 | Lowe et al. |
| 2010/0314405 A1 | 12/2010 | Alvarez |
| 2010/0316468 A1 | 12/2010 | Lert et al. |
| 2010/0318219 A1 | 12/2010 | Kuehnrich et al. |
| 2011/0004536 A1 | 1/2011 | Hoersten et al. |
| 2011/0047010 A1 | 2/2011 | Arnold et al. |
| 2011/0060454 A1 | 3/2011 | Lowe et al. |
| 2011/0060456 A1 | 3/2011 | Lowe et al. |
| 2011/0093329 A1 | 4/2011 | Bodor et al. |
| 2011/0103609 A1 | 5/2011 | Pelland et al. |
| 2011/0130873 A1 | 6/2011 | Yepez et al. |
| 2011/0131652 A1 | 6/2011 | Robinson et al. |
| 2011/0145033 A1 | 6/2011 | Kuehnrich et al. |
| 2011/0153060 A1 | 6/2011 | Yepez et al. |
| 2011/0153067 A1 | 6/2011 | Weinshenker |
| 2011/0153071 A1 | 6/2011 | Claessen |

(56) References Cited

U.S. PATENT DOCUMENTS

| | | | |
|---|---|---|---|
| 2011/0238194 A1 | 9/2011 | Rosenberg | |
| 2011/0238296 A1 | 9/2011 | Purks et al. | |
| 2012/0046786 A1 | 2/2012 | Kuehnrich et al. | |
| 2012/0059511 A1 | 3/2012 | Majer | |
| 2012/0123587 A1 | 5/2012 | Mockus et al. | |
| 2012/0310409 A1 | 12/2012 | Breitenbach et al. | |
| 2012/0311633 A1 | 12/2012 | Mandrekar et al. | |
| 2012/0330458 A1 | 12/2012 | Weiss | |
| 2013/0046707 A1 | 2/2013 | Maskatia et al. | |
| 2013/0060648 A1 | 3/2013 | Maskatia et al. | |
| 2013/0238115 A1 | 9/2013 | Smith et al. | |
| 2013/0310970 A1 | 11/2013 | Segal et al. | |
| 2014/0052292 A1 | 2/2014 | Lowe | |
| 2015/0269660 A1* | 9/2015 | Lowe | G06Q 10/06 700/237 |

FOREIGN PATENT DOCUMENTS

| | | |
|---|---|---|
| DE | 3529155 A1 | 2/1987 |
| EP | 0060643 A2 | 9/1982 |
| EP | 0205691 A1 | 12/1986 |
| EP | 0247876 A2 | 12/1987 |
| EP | 0249367 A2 | 12/1987 |
| EP | 0287367 A1 | 10/1988 |
| EP | 0572119 A2 | 12/1993 |
| EP | 0986033 A2 | 3/2000 |
| EP | 1367549 A1 | 12/2003 |
| EP | 2113892 A1 | 11/2009 |
| EP | 1396824 B1 | 7/2010 |
| EP | 2249367 A1 | 11/2010 |
| FR | 2549624 A1 | 1/1985 |
| FR | 2559599 A1 | 8/1985 |
| FR | 2562293 A1 | 10/1985 |
| GB | 380926 A | 9/1932 |
| GB | 2143662 A | 2/1985 |
| GB | 2172720 A | 9/1986 |
| GB | 2402242 A | 12/2004 |
| JP | S55156107 A | 12/1980 |
| JP | S5647855 A | 4/1981 |
| JP | H02178795 A | 7/1990 |
| JP | H0362189 A | 3/1991 |
| JP | H03119496 A | 5/1991 |
| JP | H10247982 A | 9/1998 |
| JP | 2000149136 A | 5/2000 |
| JP | 2003036328 A | 2/2003 |
| JP | 2004094857 A | 3/2004 |
| JP | 2009043143 A | 2/2009 |
| KR | 1019990066053 A | 8/1999 |
| KR | 20030089154 A | 11/2003 |
| KR | 20040069053 A | 8/2004 |
| KR | 20060080175 A | 7/2006 |
| KR | 20060114658 A | 11/2006 |
| KR | 20070021301 A | 2/2007 |
| WO | 8700948 A1 | 2/1987 |
| WO | 8705425 A1 | 9/1987 |
| WO | 8804085 A1 | 6/1988 |
| WO | 8806771 A1 | 9/1988 |
| WO | 9300644 A1 | 1/1993 |
| WO | 9404446 A1 | 3/1994 |
| WO | 9618972 A1 | 6/1996 |
| WO | 9847799 A1 | 10/1998 |
| WO | 9924902 A1 | 5/1999 |
| WO | 0038120 A1 | 6/2000 |
| WO | 0072160 A1 | 11/2000 |
| WO | 0225552 A2 | 3/2002 |
| WO | 0229708 A1 | 4/2002 |
| WO | 2004070646 A2 | 8/2004 |
| WO | 2005062887 A2 | 7/2005 |
| WO | 2006112817 A1 | 10/2006 |
| WO | 2006116108 A2 | 11/2006 |
| WO | 2006116109 A2 | 11/2006 |
| WO | 2006116110 A2 | 11/2006 |
| WO | 2006116112 A1 | 11/2006 |
| WO | 2006116113 A2 | 11/2006 |
| WO | 2006116114 A2 | 11/2006 |
| WO | 2006116115 A2 | 11/2006 |
| WO | 2006116116 A2 | 11/2006 |
| WO | 2006130638 A2 | 12/2006 |
| WO | 2007012816 A1 | 2/2007 |
| WO | 2009032946 A1 | 3/2009 |
| WO | 2010048375 A1 | 4/2010 |
| WO | 2011022689 A2 | 2/2011 |
| WO | 2011028727 A2 | 3/2011 |
| WO | 2011028728 A2 | 3/2011 |
| WO | 2011031532 A2 | 3/2011 |

OTHER PUBLICATIONS

International Search Report for Application No. PCT/US2006/15126, mailed on Apr. 3, 2008, 1 page.
International Search Report for Application No. PCT/US2010/047371 mailed on Apr. 29, 2011, 3 pages.
International Search Report for Application No. PCT/US2010/050339 mailed on Dec. 13, 2010, 5 pages.
International Search Report for Application No. PCT/US2011/48686 mailed on Apr. 9, 2012, 5 pages.
International Search Report for Application No. PCT/US2012/024900 mailed on Oct. 19, 2012, 4 pages.
International Search Report for Application No. PCT/US2012/42329 mailed on Feb. 22, 2013, 13 pages.
Issue Rolling Stones Magazine, Film Rentals by Vending Machine, 1982.
Picture of U.S. Installation of Japanese Manufactured VHS Rental Kiosk, 1984.
Supplemental European Search Report for Application No. EP05736275 mailed on Jan. 21, 2009, 2 pages.
Supplemental European Search Report for Application No. EP10810691 mailed on Feb. 26, 2013, 3 pages.
Supplemental European Search Report for Application No. EP10814374 mailed on Jan. 16, 2015, 4 pages.
Supplemental European Search Report for Application No. EP10814375 mailed on Jan. 16, 2015, 4 pages.
Supplemental European Search Report for Application No. EP10815879 mailed on Mar. 19, 2013, 2 pages.
Supplemental European Search Report for Application No. EP11820476 mailed on Jun. 22, 2015, 2 pages.
Supplemental European Search Report for Application No. EP12799917 mailed on Sep. 19, 2014, 2 pages.
Supplementary European Search Report for Application No. EP05736275, mailed on Jan. 30, 2009, 3 pages.
Technophobe's best friend by MaClatchy, Smith Erika, McClatchy-Tribune Business news Oct. 22, 2007.
Unpublished co-pending U.S. Appl. No. 12/554,905, filed Sep. 5, 2009 (which is not being furnished herewith, pursuant to the Commissioner's Notice dated Sep. 21, 2004).
A complete version of U.S. Appl. No. 61/501,026 dated Jun. 24, 2011 is presented as a part of this office action. Publication No. 2012/0330458 A1 takes a priority to this provisional application.
Article 34 Amendment for PCT Application No. PCT/US2010/046872, mailed on Jun. 28, 2011.
Canadian Office Action for Canadian Patent Application No. 2566324, mailed on Aug. 9, 2011.
Canadian Office Action for Canadian Patent Application No. 2604730, mailed on Aug. 27, 2015.
Communication from International Searching Authority transmitting International Search Report and Written Opinion, mailed Aug. 10, 2005 for International Application PCT/US05/12563.
European Office Action for EP Patent Application No. 11004042.5, mailed on Aug. 5, 2011.
European Search Report for Application No. EP11004042, mailed on Jul. 28, 2011, 2 pages.
European Search Report for Application No. EP1280399, mailed on Aug. 19, 2015, 8 pages.
Examination Report for EP 05736275.8, mailed on May 15, 2009.
International Preliminary Report on Patentability for Application No. PCT/US2005/12563, mailed on Apr. 7, 2006, 3 pages.
International Preliminary Report on Patentability for Application No. PCT/US2006/15125, mailed on Jan. 11, 2007, 4 pages.

(56) References Cited

OTHER PUBLICATIONS

International Preliminary Report on Patentability for Application No. PCT/US2006/15126, mailed on Apr. 3, 2008, 6 pages.
International Preliminary Report on Patentability for Application No. PCT/US2006/15127, mailed on Jun. 19, 2008, 4 pages.
International Preliminary Report on Patentability for Application No. PCT/US2006/15129, mailed on Sep. 20, 2006, 4 pages.
International Preliminary Report on Patentability for Application No. PCT/US2006/15130, mailed on Apr. 23, 2007, 56 pages.
International Preliminary Report on Patentability for Application No. PCT/US2006/15131, mailed on Jul. 7, 2008, 4 pages.
International Preliminary Report on Patentability for Application No. PCT/US2006/15132, mailed on Nov. 16, 2007, 4 pages.
International Preliminary Report on Patentability for Application No. PCT/US2006/15133, mailed on Jun. 6, 2007, 4 pages.
International Preliminary Report on Patentability for Application No. PCT/US2010/046219, mailed on Feb. 28, 2011, 6 pages.
International Preliminary Report on Patentability for Application No. PCT/US2010/046872, mailed on Sep. 7, 2011, 14 pages.
International Preliminary Report on Patentability for Application No. PCT/US2010/047371, mailed on Apr. 29, 2011, 7 pages.
International Preliminary Report on Patentability for Application No. PCT/US2010/047374, mailed on May 2, 2011, 7 pages.
International Preliminary Report on Patentability for Application No. PCT/US2010/050339, mailed on Apr. 12, 2012, 9 pages.
International Preliminary Report on Patentability for Application No. PCT/US2011/48686, mailed on Mar. 7, 2013, 6 pages.
International Preliminary Report on Patentability for Application No. PCT/US2012/024900, mailed on Aug. 29, 2013, 6 pages.
International Search Report and Written Opinion for Application No. PCT/US2005/012563, mailed on Aug. 10, 2005, 4 pages.
International Search Report and Written Opinion for Application No. PCT/US2006/015125, mailed on Jan. 11, 2007, 4 pages.
International Search Report and Written Opinion for Application No. PCT/US2006/015126, mailed on Apr. 3, 2008, 6 pages.
International Search Report and Written Opinion for Application No. PCT/US2006/015127, mailed on Jun. 19, 2008, 4 pages.
International Search Report and Written Opinion for Application No. PCT/US2006/015129, mailed on Sep. 20, 2006, 4 pages.
International Search Report and Written Opinion for Application No. PCT/US2006/015130, mailed on Nov. 22, 2006, 4 pages.
International Search Report and Written Opinion for Application No. PCT/US2006/015131, mailed on Jul. 7, 2008, 4 pages.
International Search Report and Written Opinion for Application No. PCT/US2006/015132, mailed on May 10, 2007, 4 pages.
International Search Report and Written Opinion for Application No. PCT/US2006/015133, mailed on Jun. 6, 2007, 4 pages.
International Search Report and Written Opinion for Application No. PCT/US2010/046219, mailed on Feb. 28, 2011, 10 pages.
International Search Report and Written Opinion for Application No. PCT/US2010/046872, mailed on Mar. 29, 2011, 7 pages.
International Search Report and Written Opinion for Application No. PCT/US2010/047371, mailed on Apr. 29, 2011, 9 pages.
International Search Report and Written Opinion for Application No. PCT/US2010/047374, mailed on May 2, 2011, 9 pages.
International Search Report and Written Opinion for Application No. PCT/US2011/048686, mailed on Apr. 9, 2012, 9 pages.
International Search Report and Written Opinion for Application No. PCT/US2011/050339, mailed on Feb. 29, 2012, 8 pages.
International Search Report and Written Opinion for Application No. PCT/US2012/024900, mailed on Oct. 19, 2012, 8 pages.
International Search Report and Written Opinion for Application No. PCT/US2012/042329, mailed on Feb. 22, 2013, 28 pages.
International Search Report and Written Opinion for Application No. PCT/US2013/029414, mailed on Jun. 26, 2013, 7 pages.
International Search Report and Written Opinion for Application No. PCT/US2013/029424, mailed on Jun. 21, 2013, 9 pages.
International Search Report and Written Opinion for Application No. PCT/US2013/029443, mailed on Jun. 21, 2013, 13 pages.
International Search Report for Application No. PCT/US06/015129, mailed on Sep. 20, 2006, 1 page.
International Search Report for Application No. PCT/US06/15130, mailed on Nov. 22, 2006, 1 page.
International Search Report for Application No. PCT/US06/15132, mailed on May 10, 2007, 1 page.
International Search Report for Application No. PCT/US06/15133, mailed on Jun. 6, 2007, 1 page.
International Search Report for Application No. PCT/US2005/12563, mailed on Aug. 10, 2005, 1 page.

\* cited by examiner

SHOPPING CART

| Title | Rent/Buy | Due Date | Due Time | Price | Remove |
|---|---|---|---|---|---|
| The Bourne Supremacy | *Rent | 02/09/2005 | 10.00 PM | $1.00 | Remove |

Sub Total $1.00
Tax $0.05
Total $1.05

[HELP] [START OVER]     [ADD ANOTHER MOVIE] [PROMO CODE] [CHECKOUT]

FIG. 17

ARTICLE VENDING MACHINE AND METHOD FOR EXCHANGING AN INOPERABLE ARTICLE FOR AN OPERABLE ARTICLE

CROSS REFERENCE

This application is continuation application of U.S. patent application Ser. No. 12/554,906, which was filed on Sep. 5, 2009 entitled "Article Vending Machine and Method for Exchanging an Inoperable Article for an Operable Article" which is hereby incorporated herein by reference in its entirety.

TECHNICAL FIELD

The present invention relates to improvements in article dispensing machines and components and methods related to the same. More particularly, the present invention relates to a digital video disc (DVD) dispensing apparatus and method for exchanging an inoperable article for an operable one.

BACKGROUND AND SUMMARY OF THE INVENTION

While the present invention is often described herein with reference to a digital video disc distribution system, an application to which the present invention is advantageously suited, it will be readily apparent that the present invention is not limited to that application and can be employed in article dispensing systems used to distribute a wide variety of rentable articles.

An improved DVD dispensing machine is disclosed in commonly owned U.S. Pat. No. 7,234,609, which is herein incorporated by reference in its entirety. The invention of the U.S. Pat. No. 7,234,609 and the present invention can function as a DVD dispensing machine-based distribution system that will typically have multiple units of each new release per DVD dispensing machine. The dispensing machines of the U.S. Pat. No. 7,234,609 and the present invention can stock up to two thousand DVDs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the hosting store) and convenience (e.g., open always).

The dispensing machine of the U.S. Pat. No. 7,234,609 and the present invention yields a competitive advantage in the DVD rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, DVD dispensing machines can be situated in hosting locations having high foot traffic, such as at a popular grocery store, restaurant, drug store, and/or other popular hosting locations.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from host locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the hosting locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to hosting locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD movie video and video game rental and/or purchase systems. It preferably incorporates robust, secure, scalable software that provides a fully personalized user experience and real-time feedback to hosting locations and advertisers, scalable hardware that leverages existing technologies such as touch screen, focused audio speakers and plasma video monitors, technology utilizing the Internet through a system website, and an article transport storage unit that facilitates the exchange of new DVDs for old DVDs in each machine with virtually no need for human intervention. These technologies and others fill long-felt needs in the art and give advantages over conventional video distribution options. The dispensing machine of the U.S. Pat. No. 7,234,609 and the present invention functions as much as a promotional platform as it does a rental kiosk.

By utilizing the dispensing machines and the fully-interactive, real-time, linked Internet website, consumers can rent one or more DVD movie videos, video games, or other entertainment content directly from dispensing machines as well as indirectly by making a rental reservation through the website for later pickup at a conveniently located machine. These dispensing machines are preferably networked with each other, with the inventory control and/or supply office and with the system website by phone-line, DSL, or other Internet connection at each hosting location. Through this linked network, the rental experience for each consumer can be customized based on a profile for each consumer, such as via personalized home pages and rental screens.

As with any DVD rental system, from time to time a user may return a damaged or otherwise unplayable disk, which may later be rented out to a customer who receives the unplayable disk. The present invention is directed to a DVD dispensing machines and method for permitting a customer who receives an unplayable disk to exchange that unplayable disk for a playable disk. The present invention enables a user to return the unplayable disk to the article vending machine, indicate that the user wishes to exchange an unplayable disk via a user interface, and exchange the unplayable disk for a functional one. In one embodiment, instead of permitting an exchange when a customer returns an unplayable disk, the article dispensing machine may automatically reimburse the user the cost of the rental for the unplayable disk.

In certain embodiments, the article dispensing machine may first determine whether the customer is eligible to exchange the disk based on a customer criteria. This may be desirable to prevent a customer from repeatedly fraudulently claiming that a disk is inoperable in order to exchange it for a new disk without paying an extra fee. This feature may also be desirable to limit situations in which a customer has repeated problems playing various disks due to deficiencies with the customer's disk player rather than due to any problem with the disks. For example, the article dispensing machine may not permit exchange if the customer has used the exchange function for more than 20% of the customer's rentals, which may indicate that the customer is merely using the exchange function to try to get a new rental without paying another fee. In some embodiments, in response to a customer request to exchange a disk, the dispensing machine may determine whether the vending machine contains other disks of the same title. If the dispensing machine does not contain another disk of the same title, the machine may offer the customer the option to exchange the unplayable disk for a disk of a different title. Alternatively, or additionally, the dispensing machine may determine which other dispensing machines in the area have a disk of the same title and may provide the customer the choice to exchange for those disks located at a different vending machine. In certain embodiments, in response to a request from a designated service person, the article vending machine may be configured to automatically purge all of the articles that have been returned because they were inoperable.

BRIEF DESCRIPTION OF THE DRAWINGS

FIGS. 14-17 are illustrations of exemplary article browsing, search and shopping cart screens for an article dispensing machine.

DETAILED DESCRIPTION OF THE INVENTION

Figure 1:
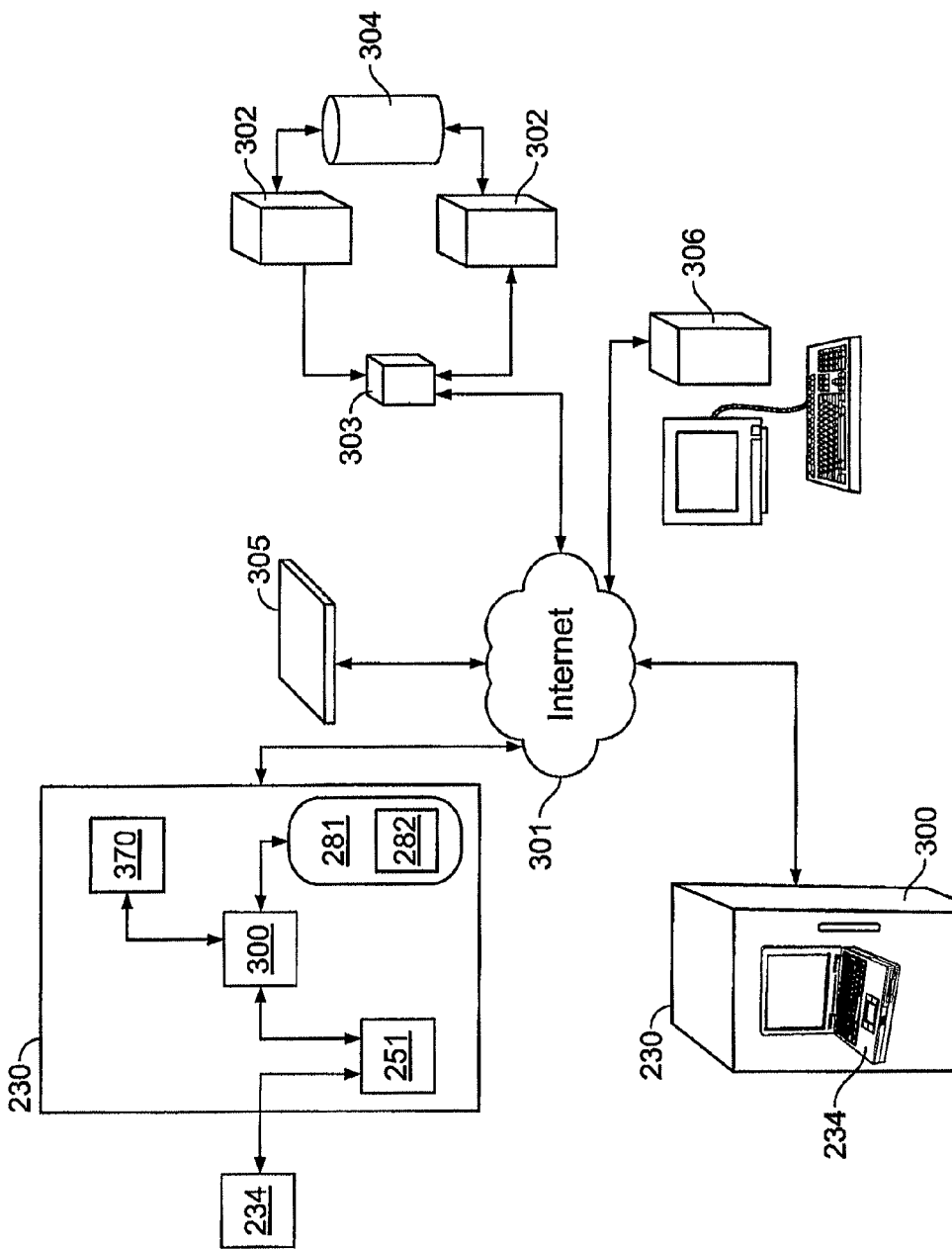
FIG. 1 is an illustration of a system for communicating and processing information in a network of article dispending machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
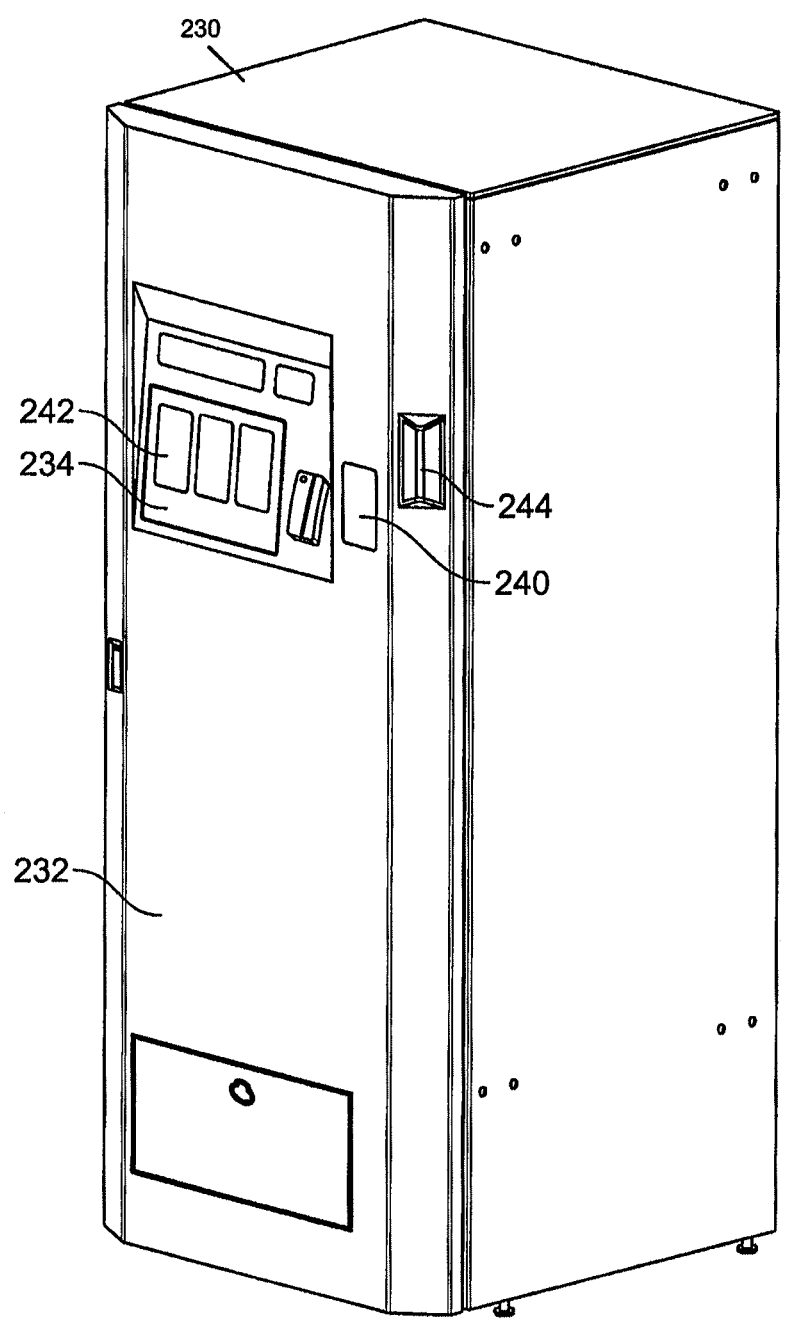
FIG. 2 is a perspective view of an article dispensing machine constructed in accordance with the principles of the present invention.
Figure 3:
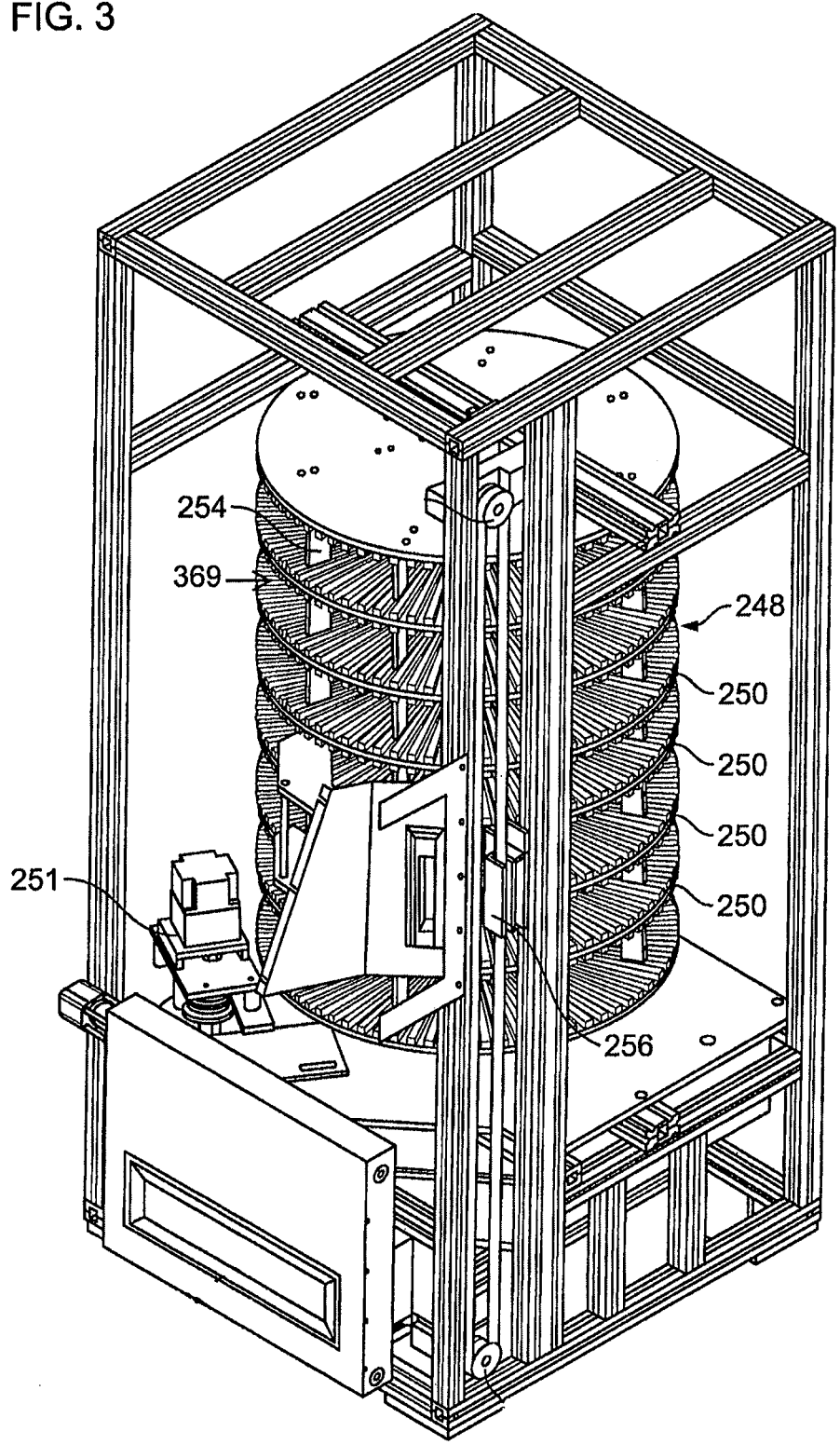
FIG. 3 is a partially open perspective view of a portion of the article dispensing machine of FIG. 2 with certain elements removed for clarity.

FIGS. 1-3 illustrate an article dispensing machine designated 230. Article dispensing machine 230 may be one of a plurality of article dispensing machines included within an article distribution system having a plurality of such machines situated at a plurality of hosting locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a user interface control system 234 and a code reading device 370 collectively referred to as "the peripheral devices." The processor 300 is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Generally, in terms of hardware architecture, the central server 302 includes a central processor and/or controller, central memory, and one or more input and/or output (I/O) devices (or peripherals) that are communicatively coupled via a local interface. The architecture of the central server is set forth in greater detail in U.S. Pat. No. 7,234,609, the contents of which are incorporated herein by reference. Numerous variations of the architecture of the central server would be understood by one of skill in the art and are encompassed within the scope of the present invention.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada. frequency (RF) or other transceiver, a telephonic interface, a bridge, and a router.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared and radio frequency networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a DVD rental transaction is performed at the article dispensing machine 230, transaction data such as the rented DVD title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network, customers and customer transactions. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each DVD title and for each machine 230 vending location. Central database 304 also stores user information and rental transaction information, such as user IDs, PINS, the date on which DVDs are due to be returned, and the date on which DVDs were rented from the machines 230. Some of this information is also preferably stored in article dispensing machine database 282. The central database 304 may also store a master inventory list of the DVDs housed in each of the dispensing machines.

Central database 304 is preferably a relational database, although other types of database architectures may be used without departing from the principles of the present invention. For example, database 304 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304. In a preferred embodiment, .net and Microsoft Reporting Services are employed, however, other technologies such as ODBC, MySQL, CFML and the like may be used.

The central controller 302 and central database 304 are also preferably accessible by a personal computer 306. The personal computer 306 will be understood as comprising hardware and software consistent with marketable personal computers, such as a display monitor, a keyboard and mouse and a microprocessor. The personal computer also comprises Internet browser software such as Firefox or Internet Explorer or another such interface. Using the browser software, a user at the personal computer 306 can access a web interface through the central controller 302. To that end, central controller 302 preferably comprises web server software such as IIS or Apache. It will be understood that a variety of web server software and web browser software exists to implement the principles of the present invention without departing therefrom. Through the web browser software, the personal computer 306 communicates with the central controller 302 and allows the user to login to a central command functionality of the central controller 302 and to view and modify data stored in the central database 304. The browser interface also allows the user to perform certain system functions, which will affect the inventory and behavior of the article dispensing machines 230.

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244 sometimes referred to herein as a receptacle. The card reader 240 is preferably designed in known fashion to read magnetically encoded membership and/or credit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas.

Turning now to the functioning of the machine during a consumer transaction, as a consumer approaches an article dispensing machine, the consumer observes the display monitor and the user interface 234. The consumer may also observe a plasma/LCD monitor displaying marketing information, or a lightbox containing marketing information for branding the vending apparatus 230. The consumer then enters the appropriate commands at the user interface control 234 associated with the dispensing machine to select a disk to be dispensed by the machine. The user interface can employ simple menus and a fixed set of keys for consumers to make their selections, it can employ break-resistant touch screens, or it can employ a combination of both. Once a selection has been made, the consumer then merely inserts his/her magnetically encoded dispense activation card into the card reader 240 positioned at the front of the dispensing machine 230 and, in response, the machine will dispense the selected disk without the need for further input by the consumer.

Referring now to FIG. 3, which shows the components positioned in the interior of dispensing machine 230, the article dispensing machine includes a storage device 248 which is a carousel-style, cylindrical storage facility having a plurality of compartmentalized rows 249 defined by circular-shaped storage racks 250 sharing a common central axis. Each of the rows has a plurality of compartments 369. Each storage rack 250 includes radially extending, angularly separated compartment panels defining article storage compartments 369 which are designed to receive and retain flat-type pack articles, such as DVD cases, as desired. The compartment panels are preferably axially aligned to retain the opposing sides of DVD cases at the top and bottom ends thereof. In that regard, the DVD cases are preferably retained between successive vertical pairs of storage racks 250. The storage racks 250 are vertically spaced by axially extending support members 254.

Figure 4:
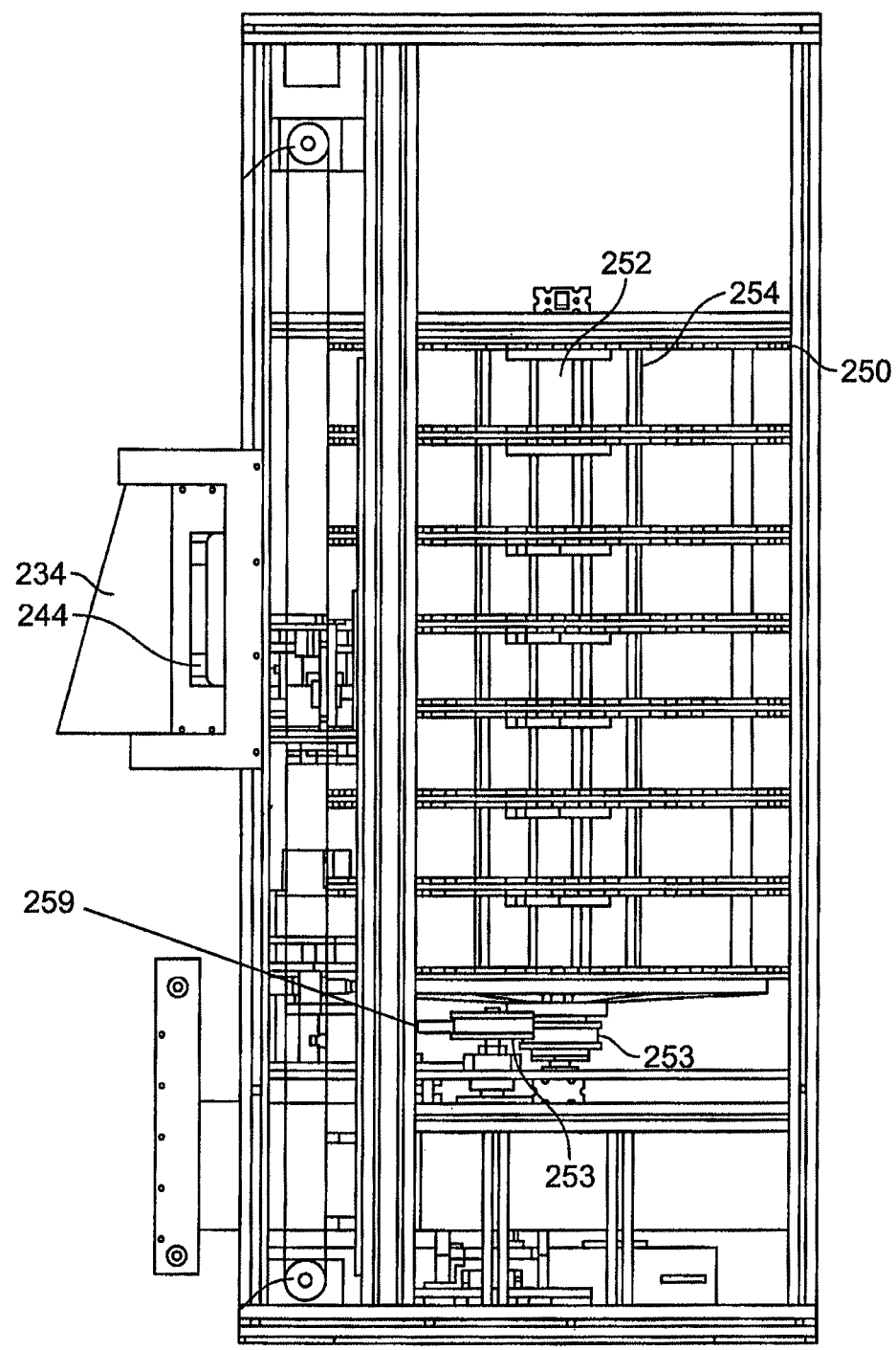
FIG. 4 is a plan view of the portion of the article dispensing machine of FIG. 3.

A first motor 251, hereinafter referred to as the rotational motor, rotates the storage device 248 about a vertical axis formed by the driven shaft 252. As shown in FIG. 4, rotational motor 251 drives a belt 259, which in turn rotates wheels 253 and shaft 252 to which the storage racks 250 are attached.

As shown in FIGS. 3 and 4, a selector arm 256 having a picker device 264 which is capable of removing a DVD from the compartments 369, is adjacent the storage device 248.

The selector arm 256 may further comprise a conveyor belt 374, which contacts one of the media products in one of the compartments 369 and conveys the product to the article transfer opening 244 whereby it is delivered to a user on the exterior of the article dispensing machine 230. The conveyor 374 is driven by a conveyor motor 372. Further details pertaining to the mechanics and operation of the selector arm are disclosed in commonly owned U.S. Pat. Nos. 7,234,609 and 7,366,586 and U.S. patent application Ser. No. 11/863,909, the contents of which are herein incorporated by reference in their entirety.

Figure 5:
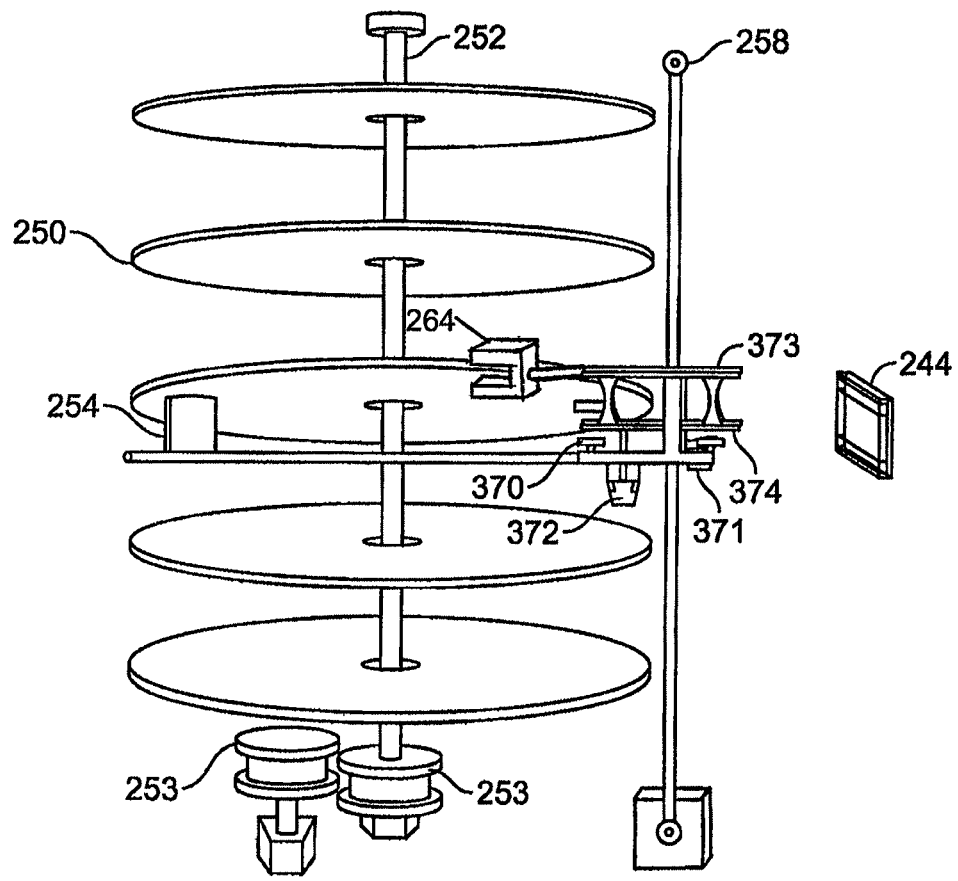
FIG. 5 is a perspective view of portions of the article dispensing machine of FIG. 2 with certain elements removed for clarity.

As shown in FIG. 5, the dispensing machine contains a code reading device 370. The code reading device may be an image capture device such as a digital camera, or a constant reading device such as a scanner or a digital video camera or a RF scanner. The code reading device is positioned to read an article identification code from an article as the article is placed in the receptacle 244. An article database correlates the article identification code to certain article information, such as, for example the title of a DVD.

Figure 6:
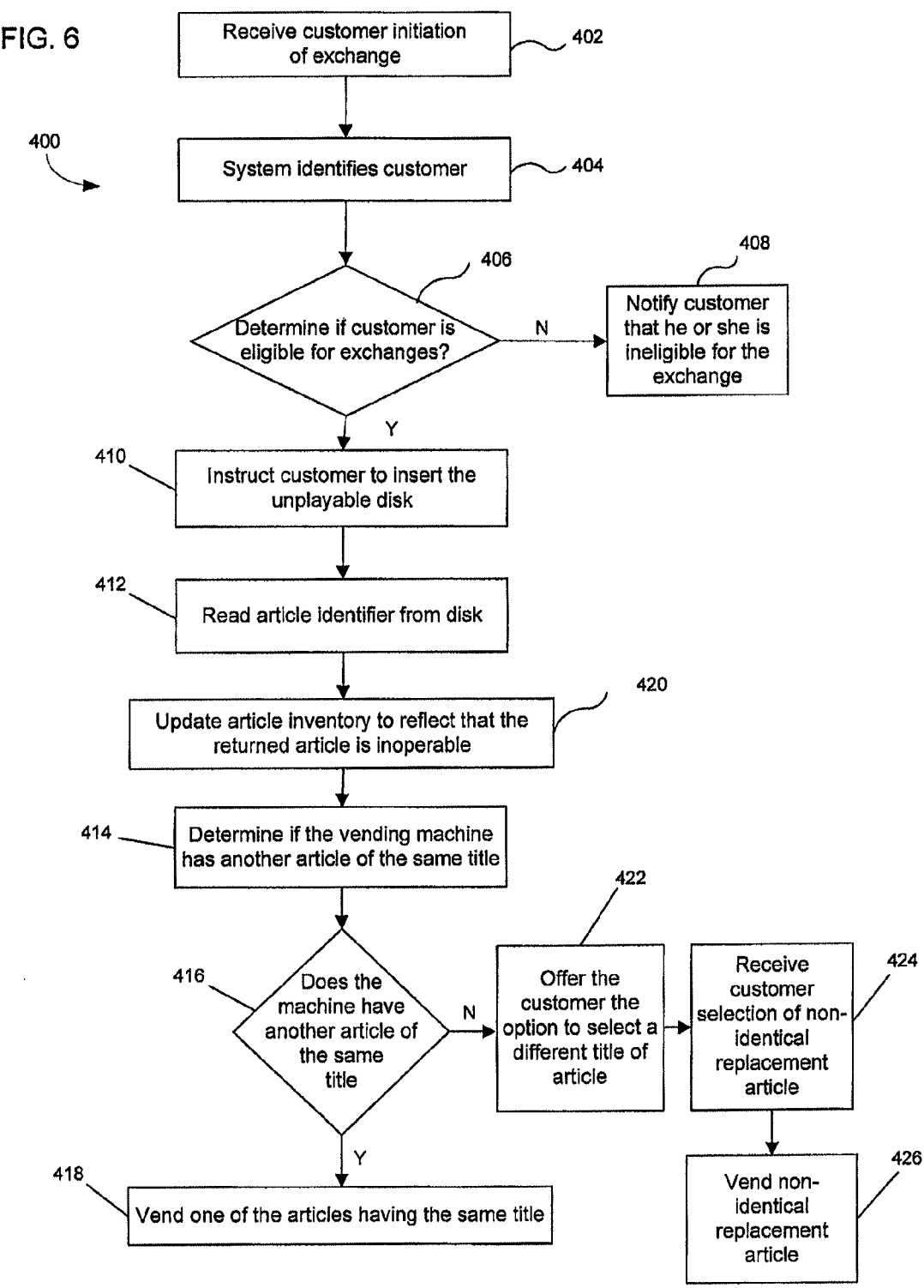
FIG. 6 is a flowchart illustrating an order of operations performed by an article dispensing medicine for exchanging an inoperable article for an operable one.

A first embodiment of a method for exchanging an inoperable disk for an operable one 400 is shown in FIG. 6. The user interface 234 presents a user returning a DVD with the option to request to exchange an inoperable DVD for an operable one as shown in step 402.

The user interface 234 identifies the customer via information obtained from a card. In this embodiment, the user interface 234 prompts the customer to insert or swipe a membership card into the card reader 240. Identification information is read from the membership card, which may be a credit or debit card, and the user is identified as shown in step 404. User identification may be performed by the vending machine processor 300 or the central processor 303.

Figure 7:
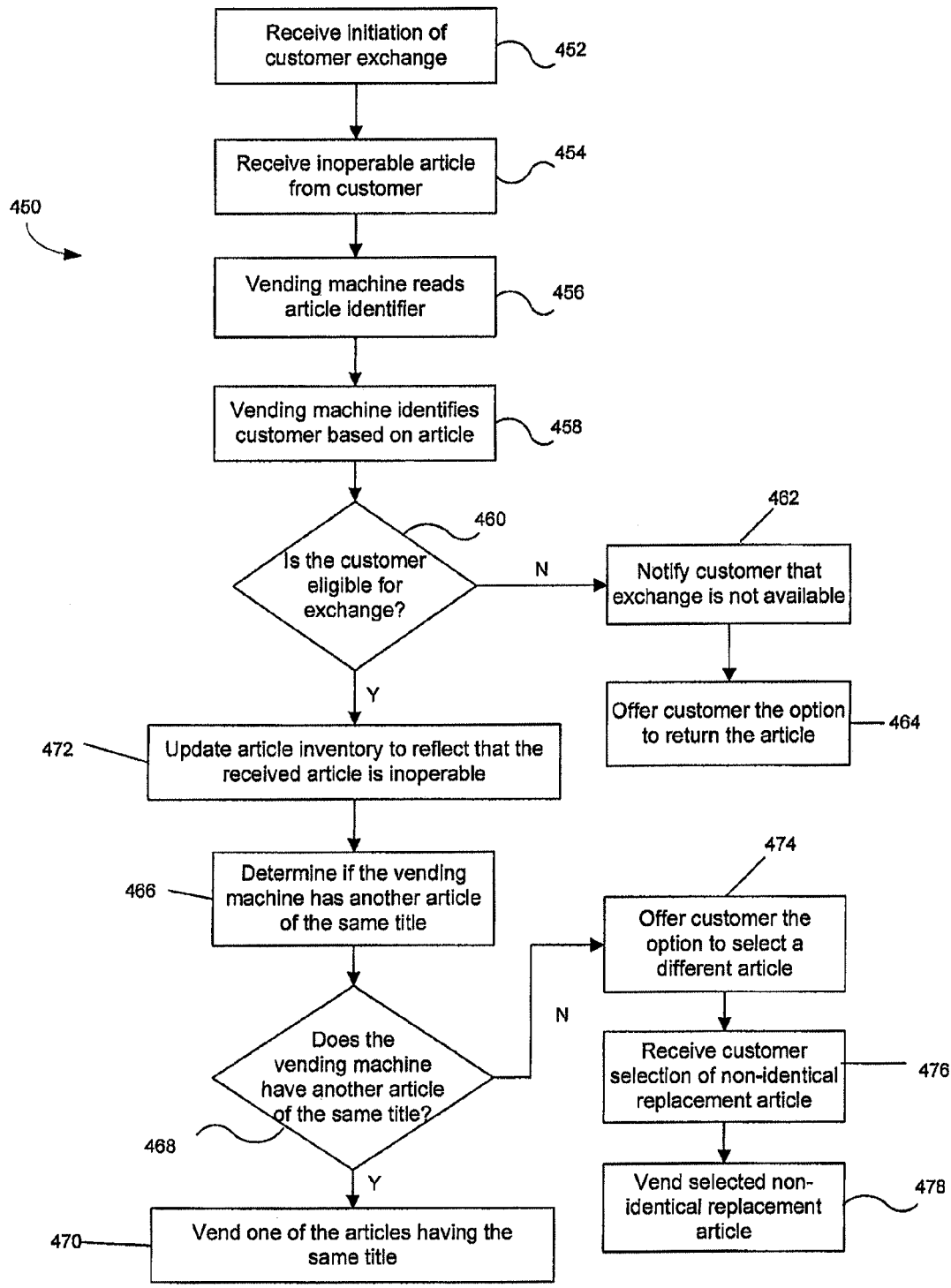
FIG. 7 is a flowchart illustrating a second embodiment of an order of operations performed by an article dispensing machine for exchanging an inoperable article for an operable one.

Alternatively, as shown in FIG. 7, the identification of the user may be determined based on the returned article. As shown in this second embodiment 450, the user initiates the exchange of an inoperable disk for an operable one via the user interface, step 452. The user interface then instructs the customer to insert the inoperable disk into the receptacle 244, as shown in step 454. The code reading device 370 then reads the article identifier from the disk as shown in step 456. The vending controller/processor then references a transaction database to identify the customer to whom the disk having the article identifier has been rented as shown in step 458. Optionally, the user interface 234 may then request verification from the customer that the system has identified the correct customer.

In the embodiments shown in FIGS. 6 and 7, 400 and 450, the user's eligibility to perform the exchange is then determined. In a first embodiment, the user's identification information is checked against a customer exchange "blacklist" that identifies users who are prohibited from exchanging an inoperable article for an operable one as shown in steps 406, 460. The users may be identified on the exchange blacklist by an identification code, for example, by the card number of the user or by a cryptographic representation of a user card number. The customer exchange blacklist may be stored on the central memory 304 or it may be stored on both the central memory and the memories of the individual kiosks 281. If the customer is listed on the customer exchange blacklist, the user interface 234 notifies the customer that he or she is ineligible to exchange the inoperable disk for an operable one, steps 408, 462. If the customer is not eligible for an exchange, the kiosk, via the user interface 234 may ask the customer if he or she wants to return the disk, as shown in step 464, at which point the normal return procedure would be followed.

In a second embodiment, instead of maintaining a blacklist, against which the customer's identification is checked, a customer's rental activity may be dynamically checked for certain eligibility criteria. A history of the customer's rental activity is stored on the central memory 304 or, alternatively, it may be stored on both the central memory and the memories of the individual kiosks 281.

One such customer criterion may be the percentage of transactions that result in exchanges of inoperable articles. For example, a customer who has exchanged an inoperable article during more than 20% of his or her rental transactions may be added to the blacklist. Another such criterion may be the frequency of customer exchanges. For example, a customer who has exchanged at least one inoperable article per week for four consecutive weeks may be blacklisted. Another such criterion may be the number of current rentals that the customer has, whereby the customer would not be permitted to perform an exchange if he or she has more than X number of rentals checked out. Another such criterion may be the number of exchanges, in which, a customer who has exchanged more than X number of times may be blacklisted. Yet another such criterion may be the time since the last exchange, for example a customer may be added to the blacklist if he or she has exchanged an inoperable article within the past day. In addition, a blacklist may use more than one of these criteria. For example, customers may be added to the blacklist if they exceed the set percentage of transactions that result in exchanges or if the customer has exchanged an article within the past day.

In the embodiment in which a customer blacklist is used, the above-listed criteria may also be used to determine when a customer is placed on the blacklist. A customer may be removed from the blacklist when that customer's transaction history no longer satisfies the blacklist criteria. For example, if a customer has been added to the blacklist because his or her percentage of transactions that resulted in exchanges exceeded the predetermined threshold, the customer may be removed from the blacklist when the customer's percentage of rentals that result in exchanges drops below that predetermined threshold. Alternatively, a customer may be removed from the blacklist manually by a customer service person with access to and permission to edit the blacklist via a personal computer in communication with the central server.

If the customer is determined to be ineligible for an exchange in process 400, as shown in step 410, the user interface 234 instructs the customer to insert the inoperable disk into the receptacle 244. The system then reads the article identifier from the disk using the code reading device 370, as shown in step 412. An article identifier database which may be stored on the kiosk memory 281, is accessed to determine the type of the article, which, in the case of a DVD or the like is representative of the title of the article, and which may be represented by a code. Once the type of the returned article is determined (the title of the DVD), the system accesses an inventory database which may be stored on the kiosk memory 281 to determine whether the article dispensing machine contains another article of the same type, herein referred to as an "identical replacement article" steps 414, 466. If the article dispensing machine contains one or more identical replacement articles available, the article dispensing machine dispenses one of the replacement articles, as shown in steps 416, 418, 468, 470. As shown in steps 420, 472, the article dispensing machine also updates its article inventory database to identify the returned inoperable article as "inoperable" 420, 472. Articles in the inventory database marked as "inoperable" are unavailable for rental. Once the user has inserted the inoperable DVD into the receptacle 244, the inoperable DVD is transferred via the transfer mechanism 256 to an open storage slot 369 in the vending machine.

Figure 12:
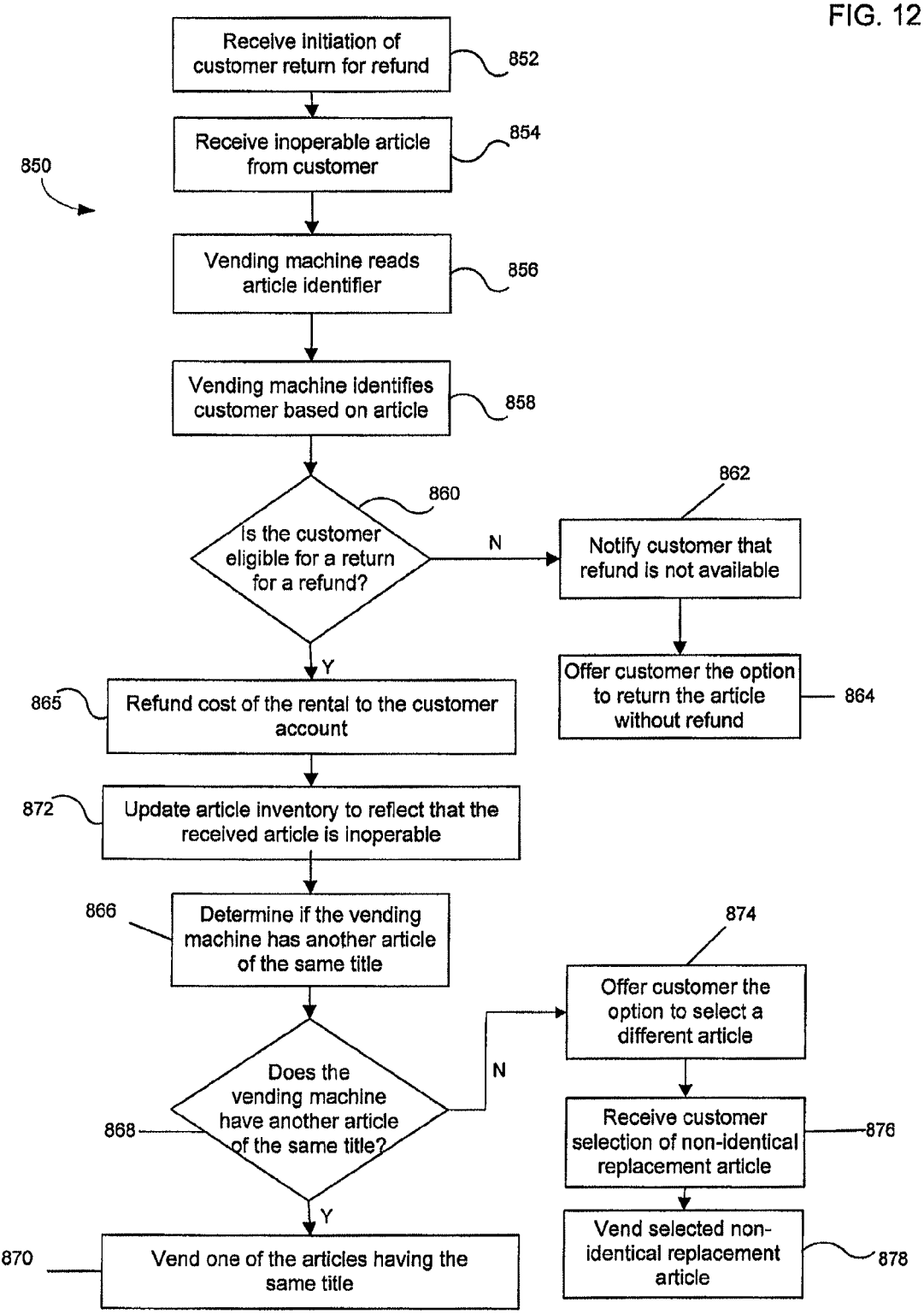
FIG. 12 is a flowchart illustrating a second embodiment of an order of operations performed by an article dispensing medicine for receiving an inoperable article and providing a refund for the cost of the rental of the inoperable article.
Figure 13:
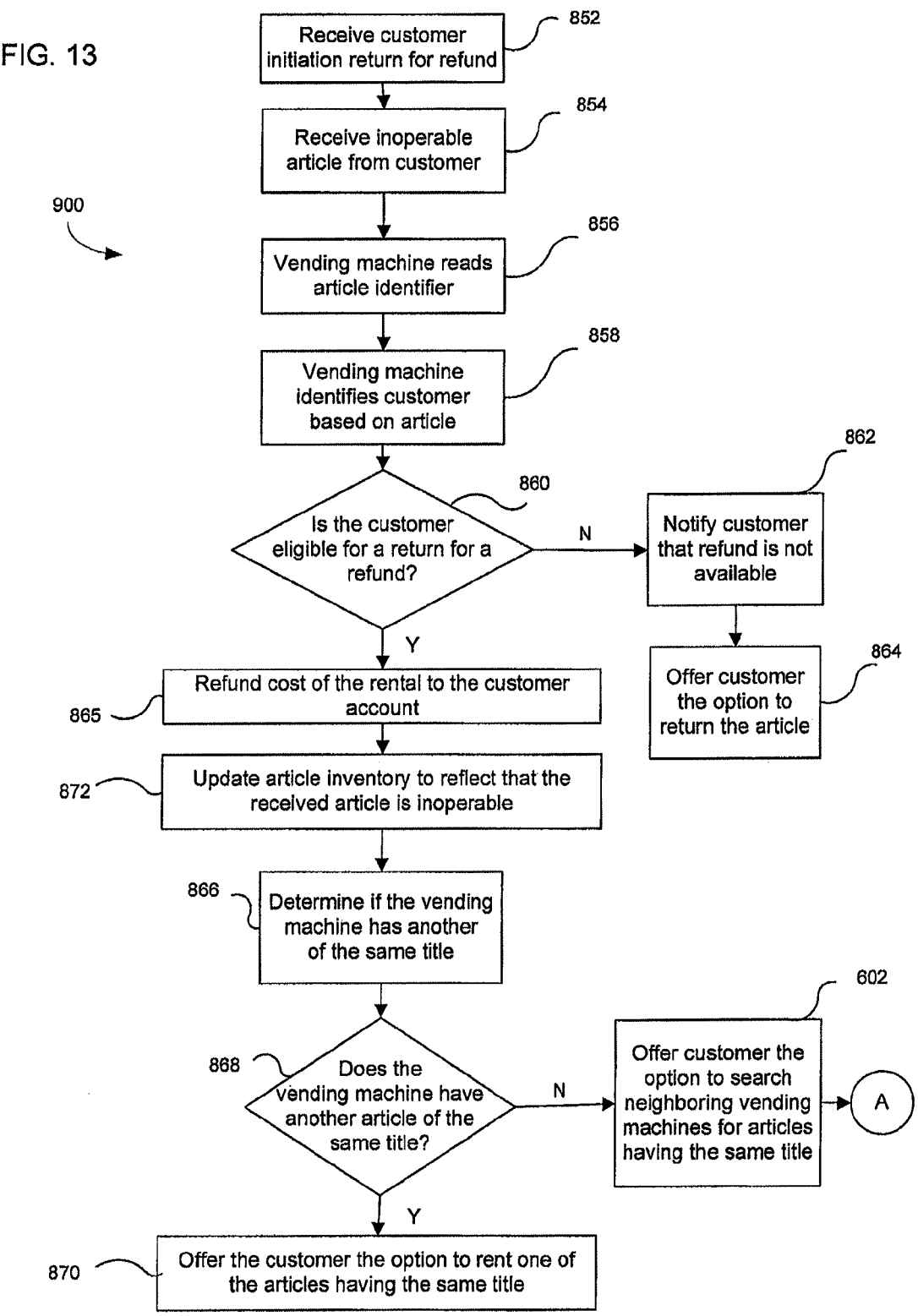
FIG. 13 is a flowchart of illustrating an order of operations performed by an article vending machine connected to a network for receiving an inoperable article and providing a refund for the cost of the rental of the inoperable article.
Figure 14:
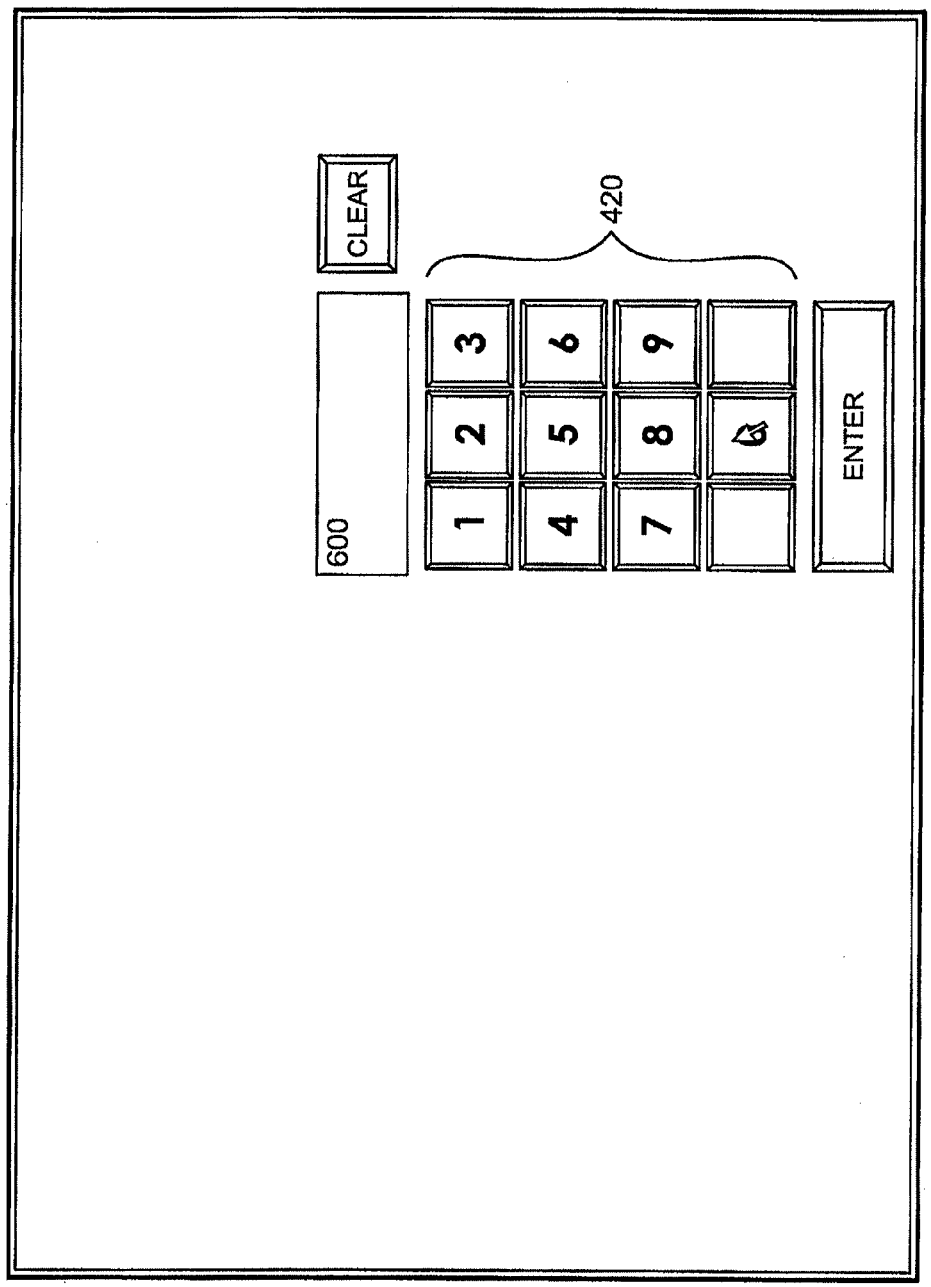
Figure 15:
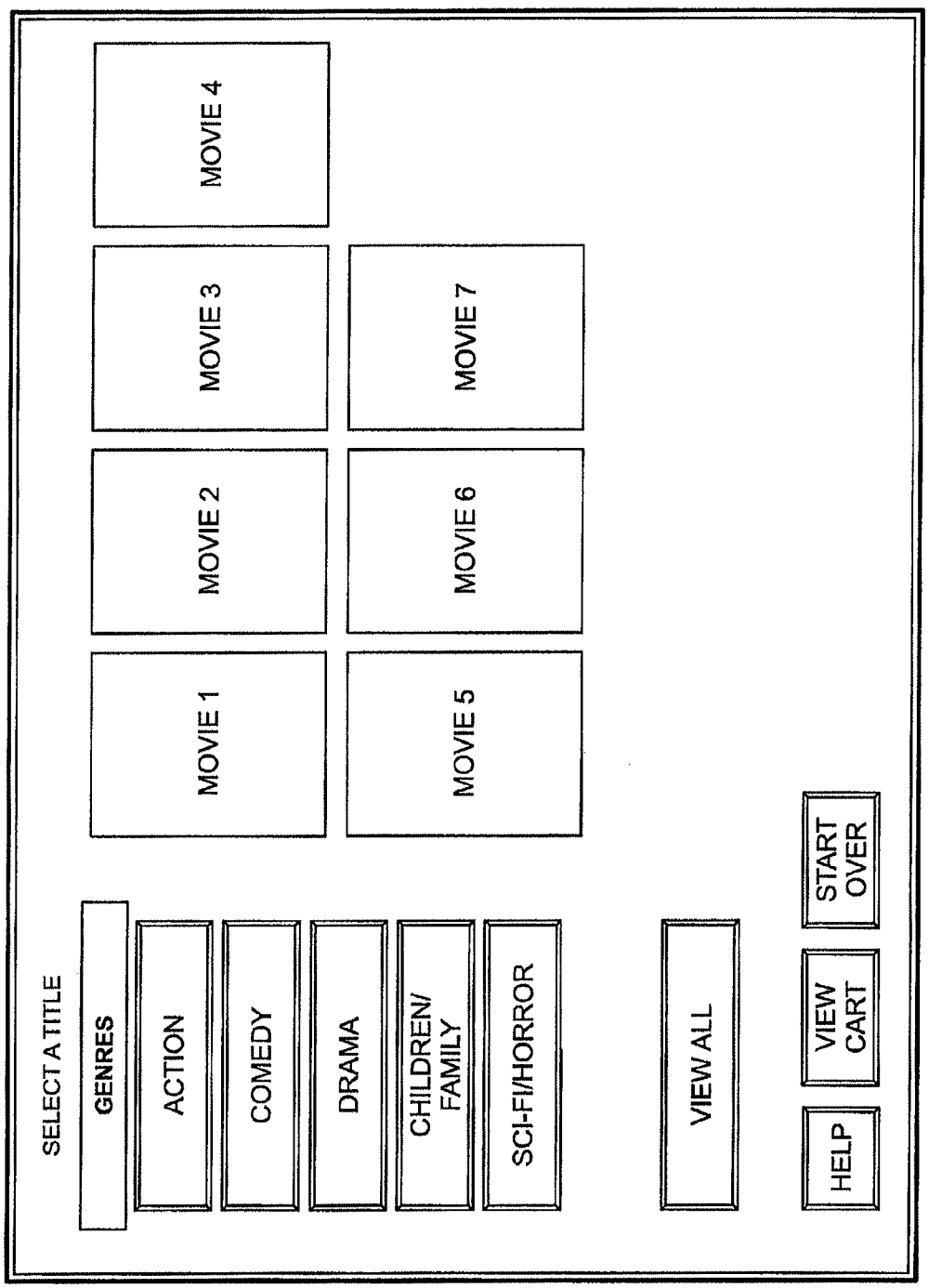
Figure 16:
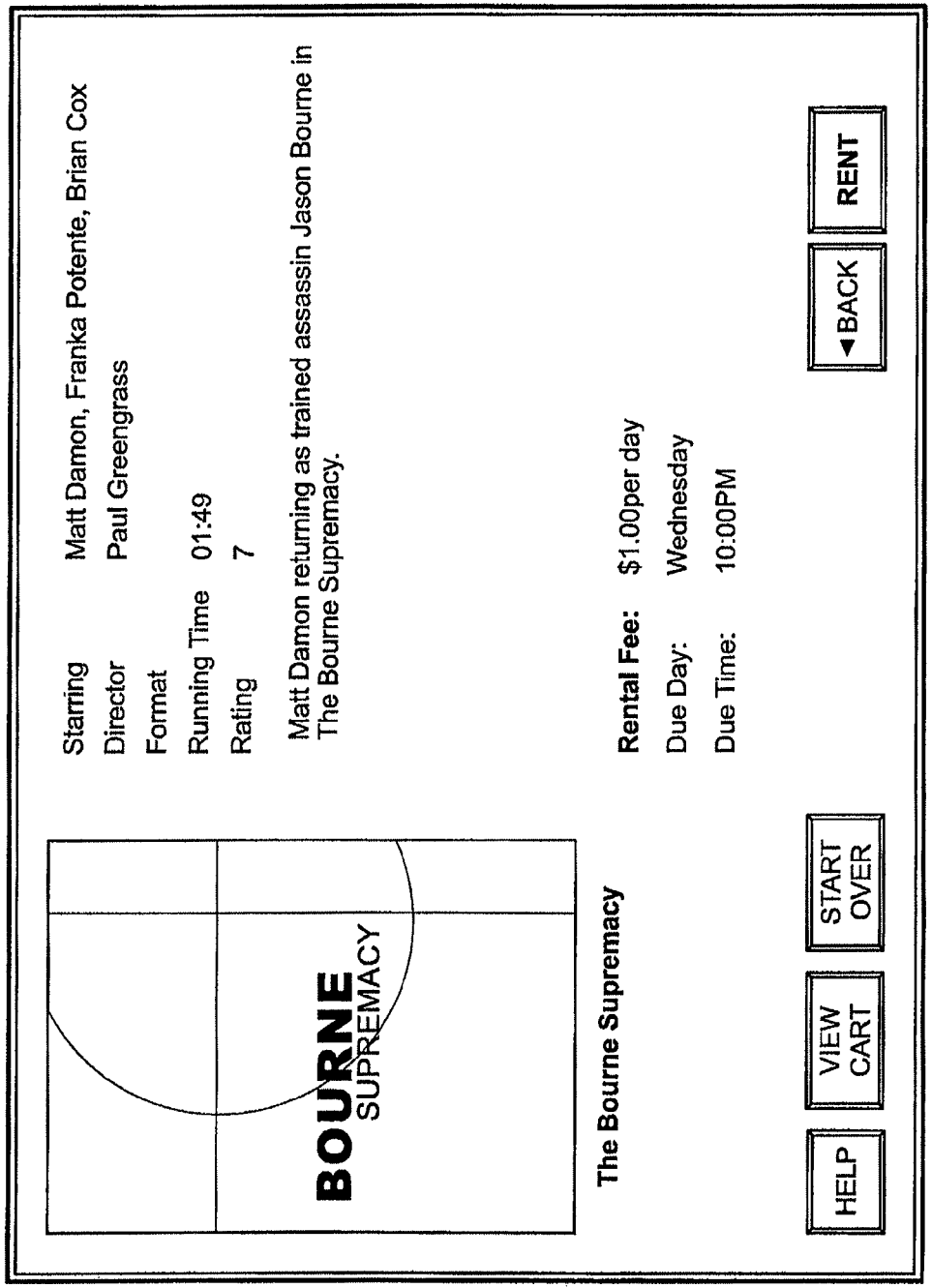

If the article dispensing machine does not contain one or more identical replacement articles available for rental, in one embodiment, the user interface 234 prompts the user to select another non-identical replacement article from the inventory of the article dispensing machine, as shown in steps 422, 474. FIGS. 12-14 show exemplary article selection and browsing screens of a user interface. The user then proceeds to select a non-identical replacement article in steps 424, 476, which may be vended to the user at no extra cost, steps 426, 478.

Figure 11:
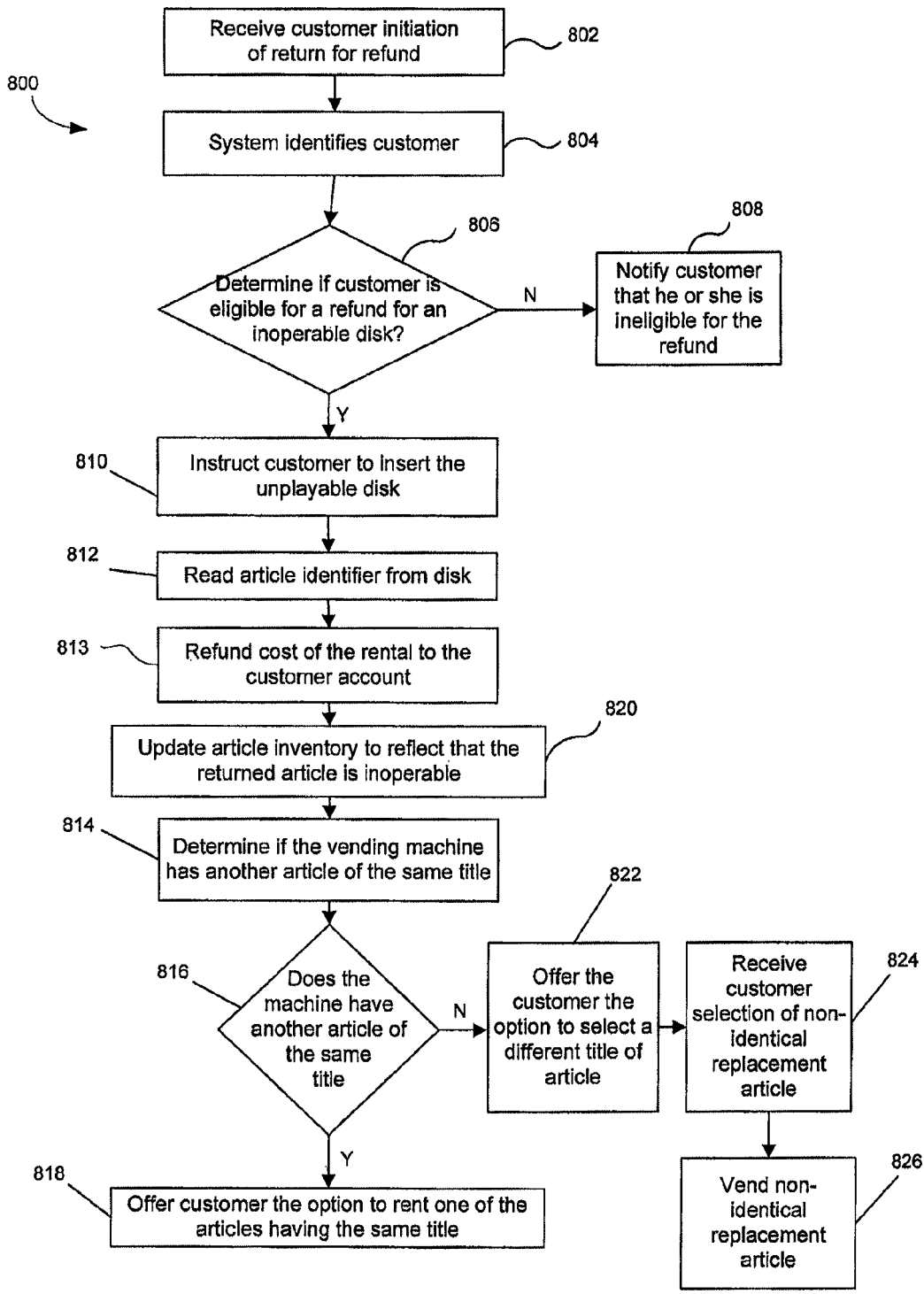
FIG. 11 is a flowchart illustrating an order of operations performed by an article dispensing medicine for receiving an inoperable article and providing a refund for the cost of the rental of the inoperable article.

As shown in FIGS. 11-13, in an alternative embodiment, the article dispensing machine may provide the customer with a refund or credit corresponding to the cost of the rental of the article instead of providing a replacement article in response to the consumer's request to return the inoperable article. FIG. 11 shows an order of operations 800 for an article dispensing machine configured to identify the customer based on information obtained from a customer identification card or the like, determine if the customer is eligible for a refund, and, if so, provide a credit or refund to the customer. Specifically, in step 802, the article dispensing machine receives the customer initiation of a return of an inoperable article for a refund via a user interface 234. The system then identifies the customer based on information received from a customer identification card or the like, as described above and as shown in step 804. Using the customer identification, the article dispensing machine then determines if the customer is eligible for a refund for the customer's return of an inoperable disk, as shown in step 806. As discussed above, such a determination may be based on a customer blacklist or the customer's rental activity. If the customer is ineligible for the refund, the article dispensing machine notifies the customer accordingly, as shown in step 808.

If, on the other hand, the article dispensing machine determines that the customer is eligible to return the inoperable disk for a refund in step 806, the machine then instructs the customer via the user interface 234 to insert the unplayable disk into the receptacle 244 as shown in step 810. Once the disk has been received by the article dispensing machine, as shown in step 812, the code reader 370 reads an article identifier from the disk to determine the identity of the disk as described in detail above. As shown in step 813, the article dispensing machine then proceeds to refund the cost of the rental for the inoperable disk to the customer's account. The instruction to provide a customer refund is transmitted from the article dispensing machine 230 to a financial server 305 and may be sent via the central server 302. As shown in step 820, the article dispensing machine inventory is updated to reflect that the returned article is inoperable.

As shown in step 814, the article dispensing machine also determines if there is another article having the same title in the machine's inventory. If the article dispensing machine has an article of the same title, i.e. an identical replacement article, in its inventory, the machine offers the customer the option to rent one of the identical replacement articles via the user interface 234, as shown in steps 816 and 818. If, on the other hand, the machine does not have an identical replacement article in its inventory, it offers the customer the option to select and rent a different article, as shown in steps 822-826.

FIG. 12 shows an order of operations 850 similar to that shown in FIG. 11, but, instead of identifying the customer based on information obtained from a customer card, customer identification is based on the identity of the returned article, as described above with respect to FIG. 7. Specifically, in step 852, the article dispensing machine receives the customer initiation of a return of an inoperable article for a refund via a user interface 234. The system then receives the inoperable article from the customer via receptacle 244, as shown in step 854.

Once the disk has been received by the article dispensing machine, as shown in step 856, the code reader 370 reads an article identifier from the disk to determine the identity of the disk as described in detail above. The vending controller/processor then references a transaction database to identify the customer to whom the disk having the article identifier has been rented as shown in step 858. Using the customer identification, the article dispensing machine then determines if the customer is eligible for a refund for the customer's return of an inoperable disk, as shown in step 860. As discussed above, such a determination may be based on a customer blacklist or the customer's rental activity. If the customer is ineligible for the refund, the article dispensing machine notifies the customer accordingly, as shown in step 862, and may offer the customer the option to return the article without a refund, as shown in step 864.

If the customer is eligible to return the article for a refund, as shown in step 860, the article dispensing machine then proceeds to refund the cost of the rental for the inoperable disk to the customer's account, as shown in step 865. The instruction to provide a customer refund is transmitted from the article dispensing machine 230 to a financial server 305 and may be sent via the central server 302. As shown in step 872, the article dispensing machine inventory is updated to reflect that the returned article is inoperable.

As shown in step 866, the article dispensing machine also determines if there is another article having the same title in the machine's inventory. If the article dispensing machine has an article of the same title, i.e. an identical replacement article, in its inventory, the machine offers the customer the option to rent one of the identical replacement articles via the user interface 234, as shown in steps 868 and 870. If, on the other hand, the machine does not have an identical replacement article in its inventory, it offers the customer the option to select and rent a different article, as shown in steps 874-878.

Figure 8:
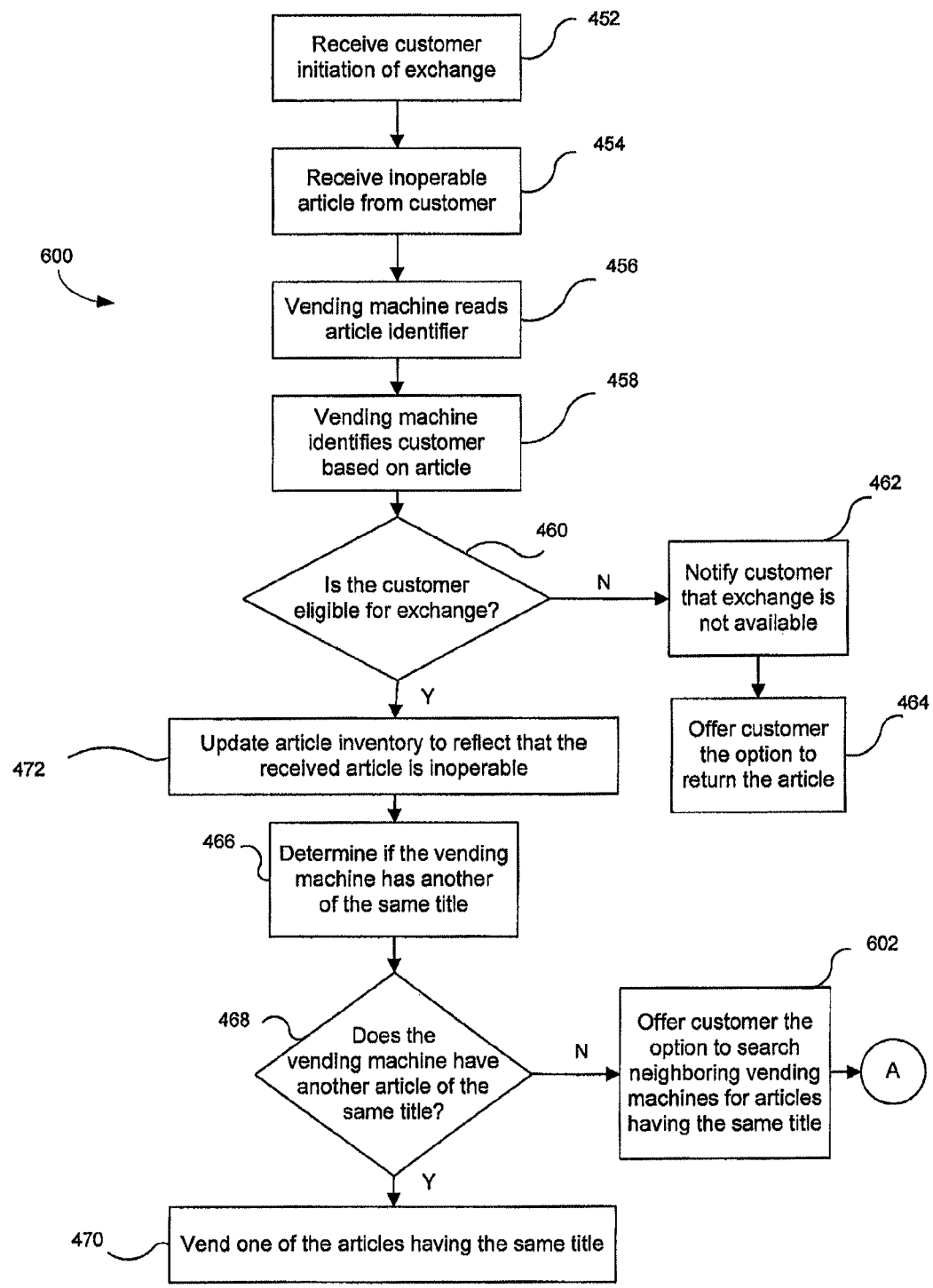
FIG. 8 is a flowchart of illustrating an order of operations performed by an article vending machine connected to a network for exchanging an inoperable article for an operable one.
Figure 9:
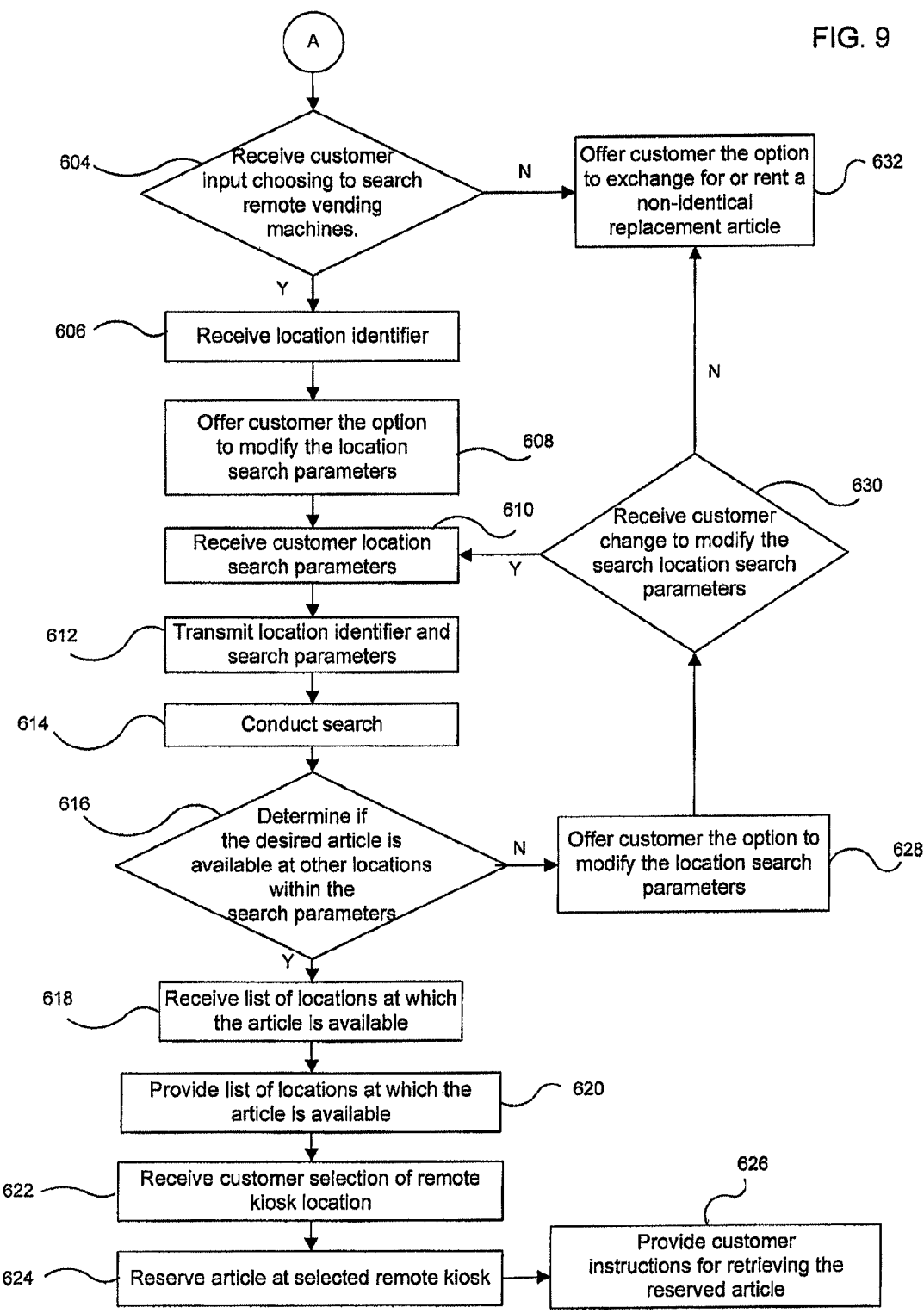
FIG. 9 is a continuation of the flowchart of FIGS. 8 and 13.

As shown in FIGS. 8, 13 and 9, and processes 600 and 900, optionally, the article dispensing machine may offer the customer the choice to search the inventories of remotely located vending machines for one or more identical replacement articles located at those remote vending machines and generate a list of remote article vending machines at which an identical replacement article is available. A database of the inventory of the remote article vending machines may be stored at the central memory 304. A copy of the inventory database may also be stored on the memory of the local kiosk 281. The user interface 234 may provide the customer with the option to select from the list of remote article vending machines at which an identical replacement article is available and reserve one of the identical replacement articles at a remote vending machine. A further discussion of searching and remotely reserving articles follows.

FIGS. 8 and 13 shows an order of operations 900 and 600 similar to those operations in FIGS. 7 and 12, respectively, but in FIGS. 8 and 13, if an identical replacement article is not present in the vending machine to which the article was returned, instead of or in addition to offering to the customer the option to rent a different article, the article dispensing offers the customer the option to search neighboring vending machines for articles having the same title as the returned article, as shown in step 602.

As shown in FIG. 9, once a request to search the inventory of remote article dispensing machines has been initiated in step 604 the system receives a location identifier, as shown in step 606. The location identifier identifies the location of the user. The location identifier can be received from several sources. First, the location identifier can be received manually from a user at the vending location. In that embodiment, the user interface 234, at the vending apparatus 230 requests that the user provide the location identifier. The user then supplies the location identifier using the keypad or touch screen. An exemplary touch screen numeric key pad is shown as 420 in FIG. 14. In that embodiment, the location identifier can be data that is easy to recall for the user, such as a zip code. In another embodiment, the location identifier is received automatically, from the vending controller 300. The vending controller in that embodiment is provided with data identifying its own location, such as an address, an intersection, a global positioning identifier or other coordinate data identifying its physical location. Alternatively, the each article dispensing machine may have a unique identifier associated with that machine. The central server may have a database stored on the central server memory that correlates a set of parameters associated with the unique identifier for each dispensing machine, including the location of the machine. In this embodiment, the central processor may use the unique identifier for each machine to look up the parameters of the article dispensing machine, including its location, on the database.

Next, as shown in step 608, the user interface may optionally request that the user limit the geographic range of the search by inputting a location search parameter. For example, the user may request that the search be limited to locations within a 5 mile radius or a specific zip code. The kiosk then receives that user entered location search parameter in step 610.

Next, in step 612, optionally the location identifier and the search parameter may be transmitted from the vending controller 300 to the central server 302. In essence, the vending controller 300 requests of the central server 302 the location of identical replacement articles. In steps 614 and 616, the central server 302 queries the database 304 to determine the location of the identified identical replacement articles. A query is performed on the database 304 to determine a vending apparatus 230 inventory having an identical replacement article. The results of the query are then sorted according to their location, and are ranked according to the locations that are closest to the location identifier. For example, the first result will be the location of a vending apparatus 230 that is one block away, the second result will be the location of a vending apparatus 230 that is 1 mile away, and so on. Further, optionally the system may be configured to transmit any predetermined number of locations. For example, the system may transmit to the user only one recommended location having the requested vendible media product, or the system may suggest any number of locations having the product, wherein the suggestions are ranked in order of proximity to the location identifier. Alternatively, the locations of a certain number of vending apparatuses within a certain distance may be displayed to the user and an indicator may identify to the user which of those locations has the identical replacement article in stock.

In step 618, the location of a vending kiosk 230 or locations of multiple kiosks having the requested vendible media product in their vending inventory is received by the vending kiosk 230 at the first location from the central server. In step 620, the location or locations can be displayed on the touch sensitive display 234 at the vending apparatus 230. Then, in step 622, the system generates an interface at the first location from which the user can reserve the identical replacement article, located at the second location. Thus, the user interface at the first vending apparatus 230 allows the user to reserve the identical replacement article from the inventory at a second, remotely located vending apparatus 330. The user reserves the identical replacement article via the user interface at the first vending location, and the transaction data is transmitted to the central server 302, and then to a vending controller 300 at the second remote vending location which reserves the article for pick up by the customer as shown in step 624. The user interface then provides the customer instructions for retrieving the reserved article at the remote kiosk, as shown in step 626.

Then, at the remote vending location, the vending controller 300 receives user identification, such as a credit card or identification card passed through the card reader 240 or, alternatively, a PIN provided by the user using the keypad 242. When the vending controller 300 at the second vending location has confirmed the identity of the user, the vending controller 300 generates a signal to deliver the identical replacement article to the user at the second vending location.

If the search for remote vending machines having an identical replacement article, step 614, within the user designated search parameters does not result in any available locations, optionally the user interface may offer the customer the option to modify the location search parameters, as shown in step 628. If the customer opts to modify the search parameters, a new search is conducted using the modified parameters. If the customer opts not to modify the search parameters, the customer may be given the option to select a non-identical replacement article, as shown in steps 630, 632.

Figure 10:
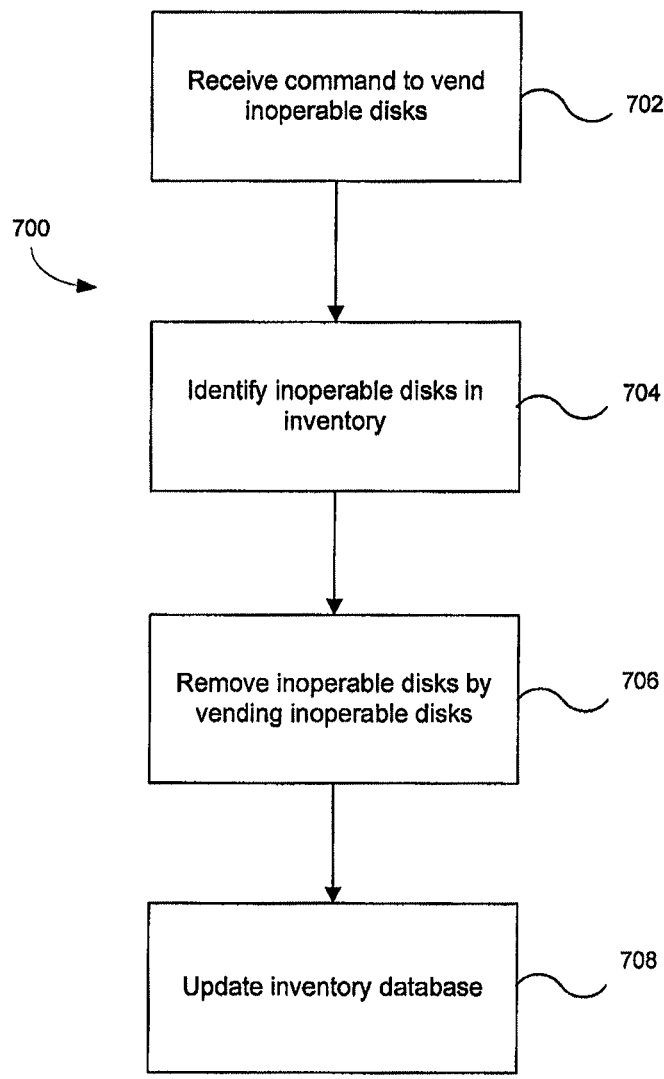
FIG. 10 is a flowchart of illustrating an order of operations performed by an article vending machine for dispensing inoperable articles.

In another aspect of certain embodiments shown in FIG. 10 as process 700, an article vending machine may be configured to automatically dispense all of the disks that have been identified as inoperable to a service person. The vending machine is configured to receive a command from an authorized service person instructing the vending machine to dispense all of the disks that have been designated as inoperable step 702. The processor references the inventory database to identify each disk that has been identified as inoperable, step 704. The transfer mechanism 256 then removes the inoperable disks from their storage slots one at a time and vends each disk from the receptacle, step 706. The inventory database is updated to reflect that the vended inoperable disks have been removed from the article vending machine, step 708.

Any process descriptions or blocks in figures represented in the figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

While the specific embodiments have been illustrated and described, numerous modifications come to mind without significantly departing from the spirit of the invention, and the scope of protection is only limited by the scope of the accompanying Claims.

What is claimed:

1. An article vending machine configured to receive an inoperable article and provide a refund for rental of the inoperable article, the article vending machine comprising:
    a user interface configured to receive, from a customer, a request to initiate a return of an inoperable article for a refund;
    a receptacle for receiving the inoperable article;
    a selector arm for transferring articles within the article vending machine, the selector arm being configured to:
    engage the inoperable article at a first position proximate to the receptacle,
    transfer the inoperable article from the first position to a second position within the first article vending machine, and disengage the inoperable article at the second position;
    an inventory comprised of a plurality of articles;
    a memory containing a database identifying each inoperable article that has been received; and
    a processor in communication with the user interface and the memory, and configured using program code to:
    determine if the customer is eligible to receive a refund for a rental cost of the inoperable article,
    if the customer is eligible, provide a refund for the rental cost of the inoperable article,
    receive a request from a service person via the user interface to purge all inoperable articles, and
    in response to the request to purge, access the database to identify each article identified as inoperable, and
    provide for removal, from the second position, each of the identified inoperable articles.

2. The article vending machine of claim 1, wherein the articles are automatically dispensed via the receptacle in response to the request from the service person to purge all of the articles identified as inoperable in the database.

3. The article vending machine of claim 1, wherein the selector arm includes a picker device that is configured, in response to receiving the request to purge, to engage each inoperable article in the second position within the article vending machine, and to continue engaging the inoperable article while the selector arm transfers the article from the second position to the receptacle.

4. The article vending machine of claim 1, wherein the selector arm includes a conveying device that is configured to dispense the inoperable articles through the receptacle by transferring the inoperable articles towards the receptacle.

5. The article vending machine of claim 1, wherein the program code is further configured to determine if the inventory includes a replacement article that is identical to the inoperable article, and if it does, provide, via the user interface, an option to receive the identical replacement article from the inventory.

6. The article vending machine of claim 5, wherein the program code is further configured to provide the refund in response to determining that the article vending machine inventory does not include an identical replacement article.

7. The article vending machine of claim 5, wherein the program code is further configured to, in response to determining that the inventory does not include an identical replacement article, provide, via the user interface, an option to receive a non-identical replacement article from the inventory.

8. The article vending machine of claim 1, wherein the determination of whether a customer is eligible to receive a refund for the inoperable article is based, at least in part, on at least one customer criterion selected from the group consisting of number of returned inoperable articles, frequency of returns of inoperable articles, percentage of transactions resulting in a return of an inoperable article, and time of last return of an inoperable article.

9. The article vending machine of claim 1, wherein the determination of whether a customer is eligible to receive a refund is based on whether the customer is identified in an inoperable article refund blacklist stored in the memory.

10. The article vending machine of claim 1, wherein the program code is further configured to:
    read an article identifier from the inoperable article;
    based on the article identifier, identify a database entry for the inoperable article in the database; and
    modify the database entry for the inoperable article to indicate that the corresponding article is inoperable.

11. The article vending machine of claim 10, wherein program code is further configured to delete the database entries of the inoperable articles that are removed from the article vending machine in response to the request to purge.

12. A network of article vending machines comprising:
    a first article vending machine comprising:
        an inventory comprised of a plurality of articles,
        a receptacle for receiving an inoperable article,
        a selector arm for transferring articles within the first article vending machine, the selector arm being configured to:
        engage the inoperable article at a first position proximate to the receptacle,
        transfer the inoperable article from the first position to a second position within the first article vending machine, and
        disengage the inoperable article at the second position, and
        a user interface configured to receive, from a customer, a request to initiate a return of the inoperable article for a refund;
    a plurality of remote article vending machines in communication with the first article vending machine, each remote article vending machine having an inventory of a plurality of articles;
    a memory configured to store one or more databases, the one or more databases including a list of the articles included in the inventory of the first article vending machine; and
    a processor configured using program code to:
    determine if the customer is eligible to receive a refund for a rental cost of the inoperable article,
    if the customer is eligible, provide a refund for the rental cost of the inoperable article, receive a request from a service person via the user interface to purge all inoperable articles,
    in response to the request to purge, access the one or more databases to identify each article identified as inoperable in the first article vending machine, and
    provide for removal, from the second position, each of the identified inoperable articles from the first article vending machine.

13. The network of article vending machines of claim 12, wherein the articles are automatically dispensed via the receptacle of the first article vending machine in response to the request from a service person to purge all inoperable articles.

14. The network of article vending machines of claim 12, wherein the program code is further configured to determine if the inventory of the first article vending machine includes a replacement article that is identical to the inoperable article, and if it does, provide, via the user interface, an option to receive the identical replacement article.

15. The network of article vending machines of claim 14, wherein the program code is further configured to, in response to determining that the inventory of the first article vending machine does not contain an identical replacement article:
- determine whether the inventories of the plurality of remote vending machines comprise an identical replacement article;
- in response to determining that one or more of the inventories contains the identical replacement article, transmit, to the user interface, an identification of the one or more remote vending machines comprising the identical replacement article; and
- provide, via the user interface, an option to reserve the identical replacement article at one of the one or more remote vending machines.

16. The network of article vending machines of claim 14, wherein the program code is further configured to, in response to determining that the inventory of the first article vending machine does not include an identical replacement article, provide, as alternative offers via the user interface, an option to reserve an identical replacement article at one of the remote vending machines and an option to receive a non-identical replacement article from the first article vending machine.

17. The network of article vending machines of claim 12, wherein the determination of whether the customer is eligible to receive a refund is based on whether the customer is identified in a list of customers ineligible to return inoperable articles for a refund, the memory being further configured to store the list of ineligible customers.

18. The network of article vending machines of claim 12, wherein the determination of whether the customer is eligible to receive a refund for the inoperable article is based, at least in part, on a frequency of returns of inoperable articles by that customer within the network of article vending machines.

* * * * *